(12) United States Patent
Ma

(10) Patent No.: US 11,843,712 B2
(45) Date of Patent: Dec. 12, 2023

(54) ADDRESS BOOK-BASED DEVICE DISCOVERY METHOD, AUDIO AND VIDEO COMMUNICATION METHOD, AND ELECTRONIC DEVICE

(71) Applicant: HUAWEI TECHNOLOGIES CO., LTD., Shenzhen (CN)

(72) Inventor: Zhiwei Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 17/761,061

(22) PCT Filed: Sep. 7, 2020

(86) PCT No.: PCT/CN2020/113714
§ 371 (c)(1),
(2) Date: Mar. 16, 2022

(87) PCT Pub. No.: WO2021/052204
PCT Pub. Date: Mar. 25, 2021

(65) Prior Publication Data
US 2022/0345563 A1 Oct. 27, 2022

(30) Foreign Application Priority Data

Sep. 19, 2019 (CN) .......................... 201910888580.5

(51) Int. Cl.
*H04M 1/27453* (2020.01)
*H04M 1/72439* (2021.01)
*H04M 1/72433* (2021.01)

(52) U.S. Cl.
CPC ... *H04M 1/27453* (2020.01); *H04M 1/72433* (2021.01); *H04M 1/72439* (2021.01)

(58) Field of Classification Search
CPC ......... H04M 1/27453; H04M 1/72433; H04M 1/72439; H04M 1/2746; H04M 1/2747;
(Continued)

(56) References Cited

U.S. PATENT DOCUMENTS 8,601,156 B2 12/2013 Laroia et al.
2013/0293664 A1 11/2013 Tsang et al.
(Continued)

FOREIGN PATENT DOCUMENTS

CN 102196107 A 9/2011
CN 102665114 A 9/2012
(Continued)

OTHER PUBLICATIONS

ITU-T H.264(Jun. 2019), Series H: Audiovisual and Multimedia Systems, Infrastructure of audiovisual services—Coding of moving video, Advanced video coding for generic audiovisual services, total 836 pages.

*Primary Examiner* — Farid Seyedvosoghi
(74) *Attorney, Agent, or Firm* — Rimon PC

(57) ABSTRACT

This application provides an address book-based device discovery method, an audio and video communication method, and related electronic devices. In the method, a personal device of a user is registered with a communication account system by using a phone number, and the communication account system is responsible for maintaining a binding relationship between the device and the phone number for capability discovery and query. A list of devices that meets a privacy policy is queried based on the phone number of the user, and a list of devices that can perform audio and video communication is displayed in an address book. Then, a Another user can reach different personal devices when calling the phone number.

18 Claims, 21 Drawing Sheets

(58) Field of Classification Search
CPC ........... H04M 1/2757; H04M 1/72412; H04W 8/005; H04W 8/18; H04W 8/183; H04L 12/2809
See application file for complete search history.

(56) References Cited

U.S. PATENT DOCUMENTS

| | | | |
|---|---|---|---|
| 2014/0359018 A1 | 12/2014 | Sun | |
| 2016/0373270 A1 | 12/2016 | Yang et al. | |
| 2018/0182389 A1* | 6/2018 | Devaraj | ................ H04L 51/224 |
| 2019/0122001 A1 | 4/2019 | Bradley et al. | |

FOREIGN PATENT DOCUMENTS

| | | | | |
|---|---|---|---|---|
| CN | 103503405 A | 1/2014 | | |
| CN | 104105160 A | 10/2014 | | |
| CN | 105045120 A | 11/2015 | | |
| CN | 105282234 A | 1/2016 | | |
| CN | 105592193 A | 5/2016 | | |
| CN | 105635625 A | 6/2016 | | |
| CN | 106302558 A | 1/2017 | | |
| CN | 106506775 A | 3/2017 | | |
| CN | 106713418 A | 5/2017 | | |
| CN | 109274847 A | 1/2019 | | |
| CN | 110198362 A | 9/2019 | | |
| EP | 3944595 A1 * | 1/2022 | ......... H04L 12/2807 |
| EP | 3944595 A1 | 1/2022 | | |

\* cited by examiner

ADDRESS BOOK-BASED DEVICE DISCOVERY METHOD, AUDIO AND VIDEO COMMUNICATION METHOD, AND ELECTRONIC DEVICE

CROSS-REFERENCE TO RELATED APPLICATIONS

This application is a National Stage of International Patent Application No. PCT/CN2020/113714 filed on Sep. 7, 2020, which claims priority to Chinese Patent Application No. 201910888580.5, filed on Sep. 19, 2019. Both of the aforementioned applications are hereby incorporated by reference in their entireties.

TECHNICAL FIELD

This application relates to the field of electronic technologies, and in particular, to an address book-based device discovery method, an audio and video communication method, and related electronic devices.

BACKGROUND

With continuous development of communication technologies and services, and in particular, coming of an era of a 5th generation (5G) mobile communications system or a new radio (NR) communications system, in addition to smartphones, an increasing quantity of electronic devices in various forms have increasingly clear requirements on communication, for example, a speaker, a television, a tablet, a watch, a camera, and a peephole.

Owning more devices requires more user operations. If each device uses an independent third-party application (App) for communication, user effort is greatly wasted, user experience deteriorates, interworking among devices becomes inconvenient, and device management costs correspondingly increase.

SUMMARY

This application provides an address book-based device discovery method, an audio and video communication method, and related electronic devices, to provide a call service based on an address book, implement one-click discovery, dialing, and call services, and improve user experience.

According to a first aspect, a device discovery method is provided, and the method includes: A first device sends second account information to a communication account server. A contact list of the first device stores the second account information, the communication account server stores account list information, and the account list information includes the second account information and device identifiers of M second devices, where M is a positive integer. The first device receives device identifiers of N second devices that are sent by the communication account server, where N is less than or equal to M, N is a positive integer, and the N second devices support audio and video communication. The first device updates the contact list of the first device based on the device identifiers of the N second devices, and displays the N second devices in the contact list.

With reference to the first aspect, in some implementations of the first aspect, the account list information further includes communication identifiers of the M second devices, and the method further includes: The first device receives communication identifiers of the N second devices that are sent by the communication account server. The first device sends an audio and video communication request to any second device in the N second devices based on the device identifiers of the N second devices and the communication identifiers of the N second devices.

With reference to the first aspect and the foregoing implementation, in some implementations of the first aspect, the M second devices include a personal device and a home device that are associated with the second account information, and when each second device in the N second devices is a personal device, that the first device sends an audio and video communication request to any second device in the N second devices includes: The first device sends the audio and video communication request to each second device in the N second devices.

With reference to the first aspect and the foregoing implementation, in some implementations of the first aspect, the M second devices include a personal device and a home device that are associated with the second account information, and when the N second devices include K home devices, where K is less than N, and K is a positive integer, that the first device sends an audio and video communication request to any second device in the N second devices includes: The first device sends the audio and video communication request to each second device in the N second devices other than the K home devices.

In the foregoing solution, first, one or more personal devices of a user are registered with a communication account system by using a phone number, to enable a communication capability of the user. If devices need to be discovered in one address book entry, a plurality of devices of the user may use a same phone number for registration. In a process in which a device registers with the communication account system by using the phone number, security authentication can be ensured by using an SMS authentication code or by using a password-free one-click login provided by a third-party enterprise (such as a carrier). This improves security of the registration process. After registration, the communication account system is responsible for maintaining a binding relationship between the device and the phone number for capability discovery and query.

In a process in which a first user dials audio and video communication to a device of a second user, a list of devices that meet a privacy policy needs to be first queried based on a second phone number of the second user, and a list of devices that can dial audio and video communication needs to be presented in an address book. Then, the first user may dial a personal device of the second user by using a call service, and the multiple personal devices of the first user can ring simultaneously. Alternatively, the first user may directly dial a home device of the second user, such as a speaker or a television.

To enable a home device in a high privacy scenario, such as a television or a speaker, to be discovered and called in an address book of the first user, a clear privacy policy needs to be formulated. For example, the television has its own device address book, and only when the first user is in the device address book of the television, the television can be found in the address book of the first user and an audio and video call request can be initiated to the television.

In the foregoing solution, a call service may be provided based on an address book, so that calls can be made to different devices of a same user, and the call service may be extended to a home device, a vehicle-mounted device, or even more 5G communications devices in a high-privacy scenario, to implement one-click discovery, dialing, and call services, provide easy-to-use communication solutions for different use scenarios, and improve user experience.

According to a second aspect, a device discovery method is provided, and the method includes: M second devices sends second account information and device identifiers of the M second devices to a communication account server, where the M second devices are associated with the second account information, and M is a positive integer. The M second devices receive communication identifiers of the M second devices that are sent by the communication account server.

With reference to the second aspect and the foregoing implementation, in some implementations of the second aspect, the method further includes: Any second device in the M second devices receives an audio and video communication request sent by a first device. A contact list of the first device stores the second account information, and all the M second devices support audio and video communication.

With reference to the second aspect and the foregoing implementation, in some implementations of the second aspect, the M second devices include N personal devices and K home devices that are associated with the second account information, and when each second device in N second devices is a personal device, that any second device in the M second devices receives an audio and video communication request sent by a first device includes: Each second device in the N second devices simultaneously receives the audio and video communication request sent by the first device.

According to a third aspect, a device discovery method is provided, and the method includes: A communication account server receives second account information sent by a first device. A contact list of the first device stores the second account information, the communication account server stores account list information, and the account list information includes the second account information and device identifiers of M second devices. The M second devices are associated with the second account information, and M is a positive integer. The communication account server sends device identifiers of N second devices to the first device, where N is less than or equal to M, N is a positive integer, and all the N second devices support audio and video communication.

With reference to the third aspect and the foregoing implementation, in some implementations of the third aspect, the account list information further includes communication identifiers of the M second devices, and the method further includes: The communication account server sends communication identifiers of the N second devices to the first device.

With reference to the third aspect and the foregoing implementation, in some implementations of the third aspect, the M second devices include a personal device and a home device that are associated with the second account information, and the account list information further includes a communication policy of the M second devices; and when each second device in the N second devices is a personal device, the communication policy indicates each second device in the N second devices to send an audio and video communication request; or when the N second devices include K home devices, the communication policy indicates each second device in the N second devices other than the K home devices to send an audio and video communication request, where K is less than N, and K is a positive integer.

According to a fourth aspect, a device discovery apparatus is provided, and the apparatus includes: a sending unit, configured to send second account information to a communication account server, where a contact list of the apparatus stores the second account information, the communication account server stores account list information, and the account list information includes the second account information and device identifiers of M second devices, where M is a positive integer; a receiving unit, configured to receive device identifiers of N second devices that are sent by the communication account server, where N is less than or equal to M, N is a positive integer, and the N second devices support audio and video communication; and a processing unit configured to: update the contact list of the apparatus based on the device identifiers of the N second devices, and display the N second devices in the contact list.

With reference to the fourth aspect, in some implementations of the fourth aspect, the account list information further includes communication identifiers of the M second devices, and the receiving unit is further configured to receive communication identifiers of the N second devices that are sent by the communication account server. The processing unit is further configured to send an audio and video communication request to any second device in the N second devices based on the device identifiers of the N second devices and the communication identifiers of the N second devices.

With reference to the fourth aspect and the foregoing implementation, in some implementations of the fourth aspect, the M second devices include a personal device and a home device that are associated with the second account information, and when each second device in the N second devices is the personal device, the sending unit is further configured to send the audio and video communication request to each second device in the N second devices.

With reference to the fourth aspect and the foregoing implementation, in some implementations of the fourth aspect, the M second devices include a personal device and a home device that are associated with the second account information, and when the N second devices include K home devices, where K is less than N, and K is a positive integer, the sending unit is further configured to send the audio and video communication request to each second device in the N second devices other than the K home devices.

According to a fifth aspect, a device discovery apparatus is provided, and the apparatus includes: a sending unit, configured to send second account information and device identifiers of M apparatuses to a communication account server, where the M apparatuses are associated with the second account information, and M is a positive integer; and a receiving unit configured to receive communication identifiers of the M apparatuses that are sent by the communication account server.

With reference to the fifth aspect and the foregoing implementation, in some implementations of the fifth aspect, the receiving unit is further configured to: receive an audio and video communication request sent by a first device, where a contact list of the first device stores the second account information, and all the M apparatuses support audio and video communication.

With reference to the fifth aspect and the foregoing implementation, in some implementations of the fifth aspect, the M apparatuses include N personal devices and K home devices that are associated with the second account information, and when each apparatus in N apparatuses is a personal device, each apparatus in the N apparatuses is further configured to simultaneously receive the audio and video communication request sent by the first device.

According to a sixth aspect, a communication account server is provided, and includes: a receiving unit configured to receive second account information sent by a first device, where a contact list of the first device stores the second account information, the communication account server stores account list information, and the account list information includes the second account information and device identifiers of M second devices, where the M second devices are associated with the second account information, and M is a positive integer; and a sending unit configured to send device identifiers of N second devices, where N is less than or equal to M, N is a positive integer, and the N second devices support audio and video communication.

With reference to the sixth aspect and the foregoing implementations, in some implementations of the sixth aspect, the account list information further includes communication identifiers of the M second devices, and the sending unit is further configured to send the communication identifiers of the N second devices to the first device.

With reference to the sixth aspect and the foregoing implementations, in some implementations of the sixth aspect, the M second devices include a personal device and a home device that are associated with the second account information, and the account list information further includes a communication policy of the M second devices; and when each second device in the N second devices is a personal device, the communication policy indicates to each second device in the N second devices to send an audio and video communication request; or when the N second devices include K home devices, the communication policy indicates each second device in the N second devices other than the K home devices to send an audio and video communication request, where K is less than N, and K is a positive integer.

According to a seventh aspect, this application provides an apparatus. The apparatus is included in an electronic device, and the apparatus has a function of implementing behavior of the electronic device in the foregoing aspect and the possible implementations of the foregoing aspect. The function may be implemented by hardware, or may be implemented by hardware executing corresponding software. The hardware or the software includes one or more modules or units corresponding to the foregoing function, for example, a display module or unit, a detection module or unit, or a processing module or unit.

According to an eighth aspect, this application provides an electronic device, including a touchscreen. The touchscreen includes a touch-sensitive surface, a display, a camera, one or more processors, a memory, a plurality of applications, and one or more computer programs. The one or more computer programs are stored in the memory. The one or more computer programs include instructions. When the instructions are executed by the electronic device, the electronic device is enabled to perform the device discovery method and the audio and video communication method in any possible implementation of any one of the foregoing aspects.

According to a ninth aspect, this application provides a server, including one or more processors, a memory, and one or more programs. The one or more programs are stored in the memory, and when the one or more programs are executed by the processor, the server is enabled to perform the device discovery method and the audio and video communication method in any possible implementation of any one of the foregoing aspects.

According to a tenth aspect, this application provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the device discovery method and the audio and video communication method in any possible implementation of any one of the foregoing aspects.

According to an eleventh aspect, this application provides a computer storage medium, including computer instructions. When the computer instructions are run on an electronic device, the electronic device is enabled to perform the device discovery method and the audio and video communication method in any possible implementation of any one of the foregoing aspects.

According to a twelfth aspect, this application provides a computer program product. When the computer program product runs on an electronic device, the electronic device is enabled to perform the device discovery method and the audio and video communication method in any possible implementation of any one of the foregoing aspects.

DESCRIPTION OF EMBODIMENTS

The following describes the technical solutions in the embodiments of this application with reference to the accompanying drawings in the embodiments of this application. In the descriptions in the embodiments of this application, unless otherwise specified, "I" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in the embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features.

The address book-based device discovery method provided in the embodiments of this application may be applied to an electronic device such as a mobile phone, a tablet computer, a wearable device, a vehicle-mounted device, an augmented reality (augmented reality, AR) device/a virtual reality (VR) device, a notebook computer, an ultra-mobile personal computer (UMPC), a netbook, or a personal digital assistant (PDA). A specific type of the electronic device is not limited in the embodiments of this application.

Figure 1:
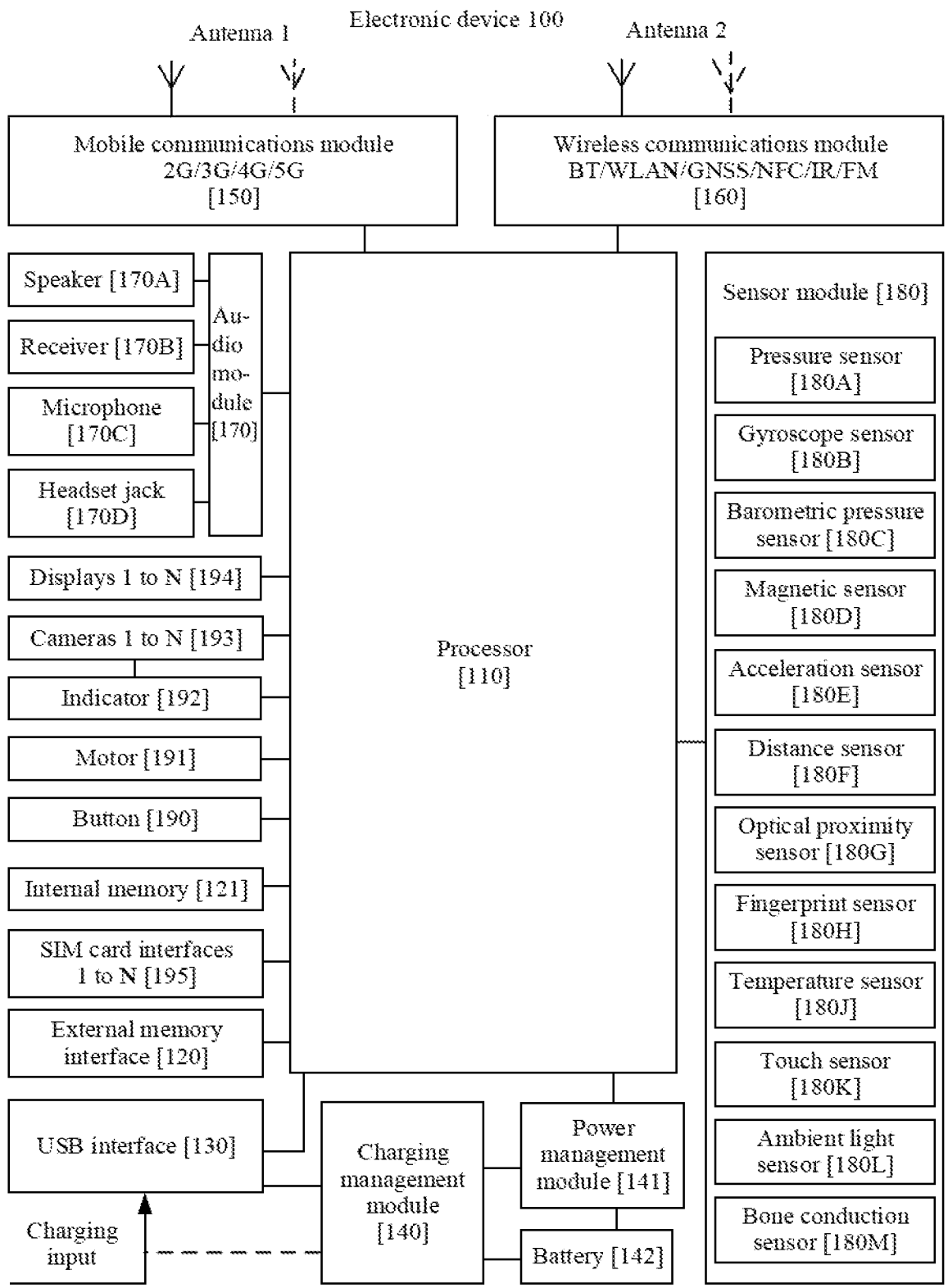
FIG. 1 is a schematic diagram of a structure of an electronic device according to this application.

For example, FIG. 1 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communication bus. The bus converts to-be-transmitted data between serial communication and parallel communication. In some embodiments, the UART interface is configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be configured to transmit data between the electronic device 100 and a peripheral device, or may be configured to connect to a headset, to play audio through the headset. The interface may be further configured to connect to another electronic device such as an AR device.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as battery capacity, quantity of battery cycles, and battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in the same device as at least some modules of the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in the same device as the mobile communications module 150 or another function module.

The wireless communications module 160 may provide a solution, applied to the electronic device 100, to wireless communication including a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), a satellite based augmentation system (SBAS), and/or the like.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 can play or record videos in a plurality of encoding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various function applications and data processing of the electronic device 100. The internal memory 121 may include a program storage area and a data storage area. The program storage area may store an operating system, an application required by at least one function (for example, a voice playing function or an image playing function), and the like. The data storage area may store data (such as audio data and a phone book) and the like that are created during use of the electronic device 100. In addition, the internal memory 121 may include a high-speed random access memory, or may include a nonvolatile memory, for example, at least one magnetic disk storage component, a flash memory, or a universal flash storage (UFS).

The electronic device 100 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode through the speaker 170A.

The receiver 170B, also referred to as an "earpiece", is configured to convert an audio electrical signal into a sound signal. When a call is answered or a voice message is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound by moving a human mouth close to the microphone 170C, to input the sound signal to the microphone 170C. At least one microphone 170C may be disposed in the electronic device 100. In some other embodiments, two microphones 170C may be disposed in the electronic device 100, to implement a noise reduction function, in addition to collecting the sound signal. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on an icon of Messages, an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to perform image stabilization during photographing. For example, when the shutter is pressed, the gyroscope sensor 180B detects an angle at which the electronic device 100 shakes, and calculates, based on the angle, a distance for which a lens module needs to compensate, and allows the lens to eliminate the shake of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect magnitudes of accelerations of the electronic device 100 in various directions (usually on three axes), and may detect magnitude and a direction of gravity when the electronic device 100 is still. The acceleration sensor 180E may be further configured to identify a posture of the electronic device, and applied to an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust the brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 reduces the performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation on or near the touch sensor 180K. The touch sensor may transfer the detected touch operation to the application processor, to determine the type of a touch event. A visual output related to the touch operation may be provided through the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in the headset, to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch-sensitive button. The electronic device 100 may receive a key input, and generate a key signal input related to a user setting and function control of the electronic device 100.

The motor 191 may generate a vibration prompt. The motor 191 may be configured to provide an incoming call vibration prompt and touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with the external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In this embodiment of this application, an Android system of a layered architecture is used as an example to describe a software structure of the electronic device 100.

Figure 2:
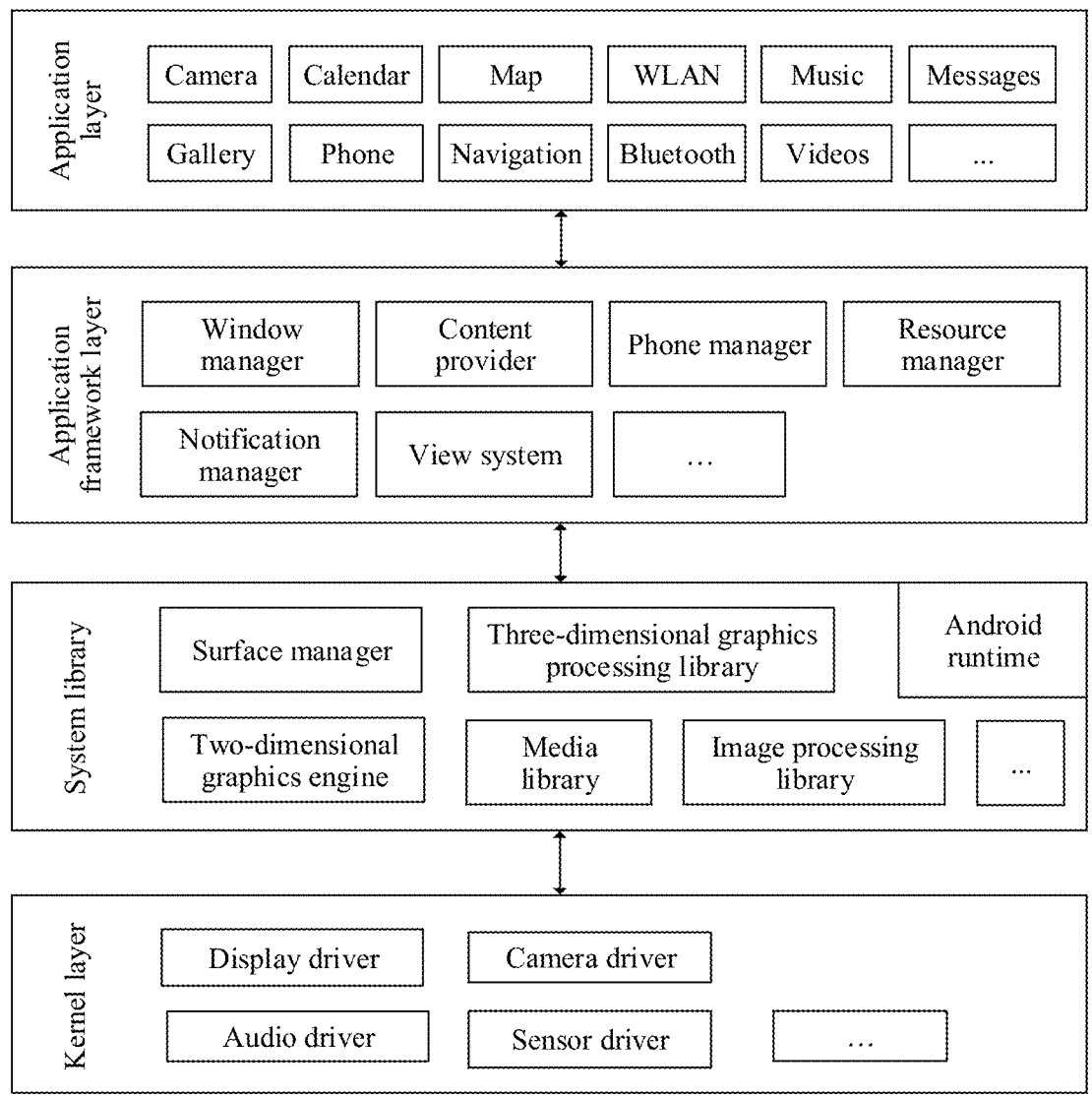
FIG. 2 is a block diagram of a software structure of an electronic device according to an embodiment of this application.

FIG. 2 is a block diagram of a software structure of the electronic device 100 in this embodiment of this application. In a layered architecture, software is divided into several layers, and each layer has a clear role and task. The layers communicate with each other through a software interface. In some embodiments, the Android system is divided into four layers, that is, an application layer, an application framework layer, an Android runtime (Android runtime) and system library, and a kernel layer from top to bottom. The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including an SMS notification icon may include a text display view and an image display view.

The phone manager is configured to provide a communication function of the electronic device 100, for example, management of a call status (including answering, declining, or the like).

The resource manager provides, for an application, various resources such as a localized character string, an icon, an image, a layout file, and a video file.

The notification manager enables an application to display notification information in the status bar, and may be configured to convey a notification message. The notification manager may automatically disappear after a short pause without requiring a user interaction. For example, the notification manager is configured to notify download completion, provide a message notification, and the like. The notification manager may be a notification that appears in a top status bar of the system in a form of a graph or a scroll bar text, for example, a notification of an application running in the background, or may be a notification that appears on the screen in a form of a dialog window. For example, text information is prompted in the status bar, a prompt tone is produced, the electronic device vibrates, or the indicator light blinks.

The Android runtime includes a kernel library and a virtual machine. The Android runtime is responsible for scheduling and management of the Android system.

The kernel library includes two parts: one part is a function that needs to be invoked by a Java language, and the other part is a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, such as a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, a static image file, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, an electronic device having the structures shown in FIG. 1 and FIG. 2 is used as an example to describe in detail, with reference to the accompanying drawings and application scenarios, the address book-based device discovery method provided in the embodiments of this application.

With continuous development of communications technologies and services, electronic devices have increasingly rich forms. Based on a form and a use scenario of the electronic device, the electronic device may be classified into a personal device and a home device. For example, a mobile phone and a watch belong to a personal device, and a speaker, a television, a tablet, a camera, and the like belong to a home shared device.

It should be understood that, the personal device is generally a mobile device, for example, may be an electronic device that can be carried by a user; and the home device is usually a fixed device, and is usually applicable to calls between close user relationships and has relatively high privacy requirements.

It should be further understood that both a current personal device and a current home device may implement a function of making a call. For example, the user may answer or make a call by using a watch. In a process of answering or making a call by using the personal device, the user does not care whether a caller uses a mobile phone 1, a mobile phone 2, or a watch 3, provided that the user can make a call. A universal call service is provided, and the mobile phone and the watch may be set to simultaneously vibrate when a call is received.

During a family call with a family member, the user can answer a call or make a video call by using the home device. When the user makes a call by using the home device, the user has a clear answer expectation. For example, when the user dials a TV in the mom's home or a speaker in the uncle's living room, the user needs to be provided with the capabilities of independently discovering and dialing the TV in the mom's home and the speaker in the uncle's living room.

Figure 3A:
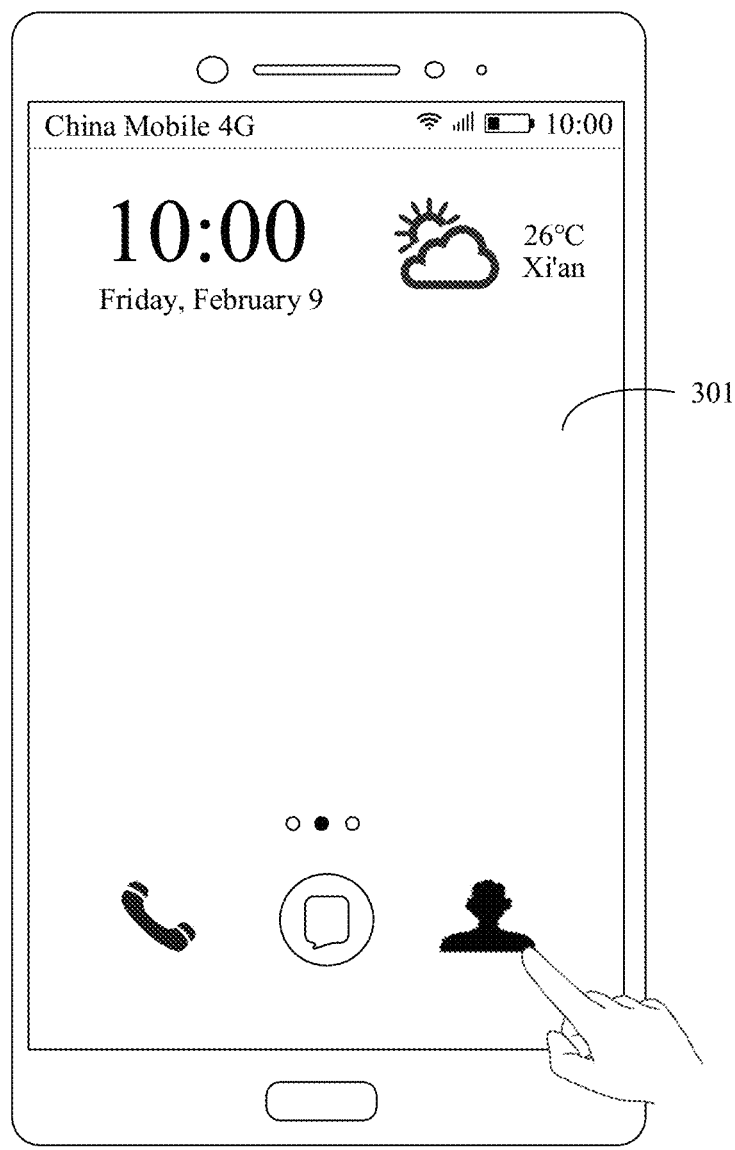
FIG. 3(a) to FIG. 3(c) are a schematic diagram of graphical user interfaces of an audio and video communication method according to an embodiment of this application.
Figure 3B:
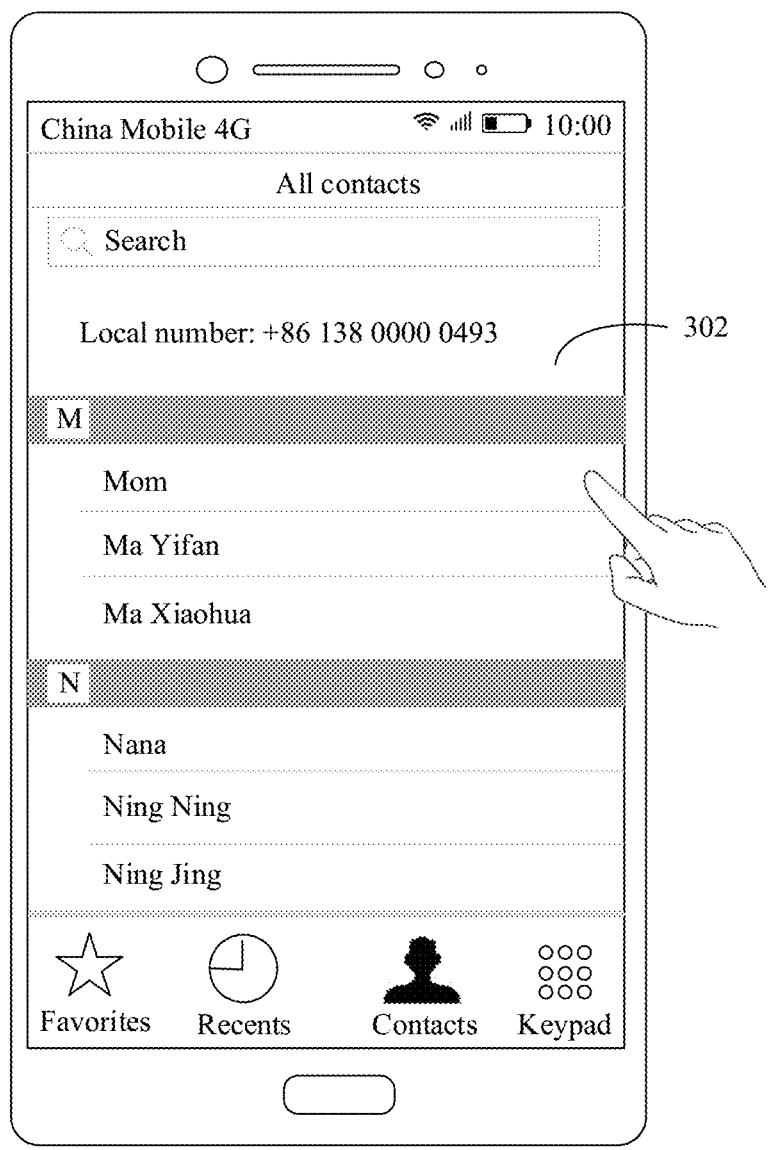
Figure 3C:
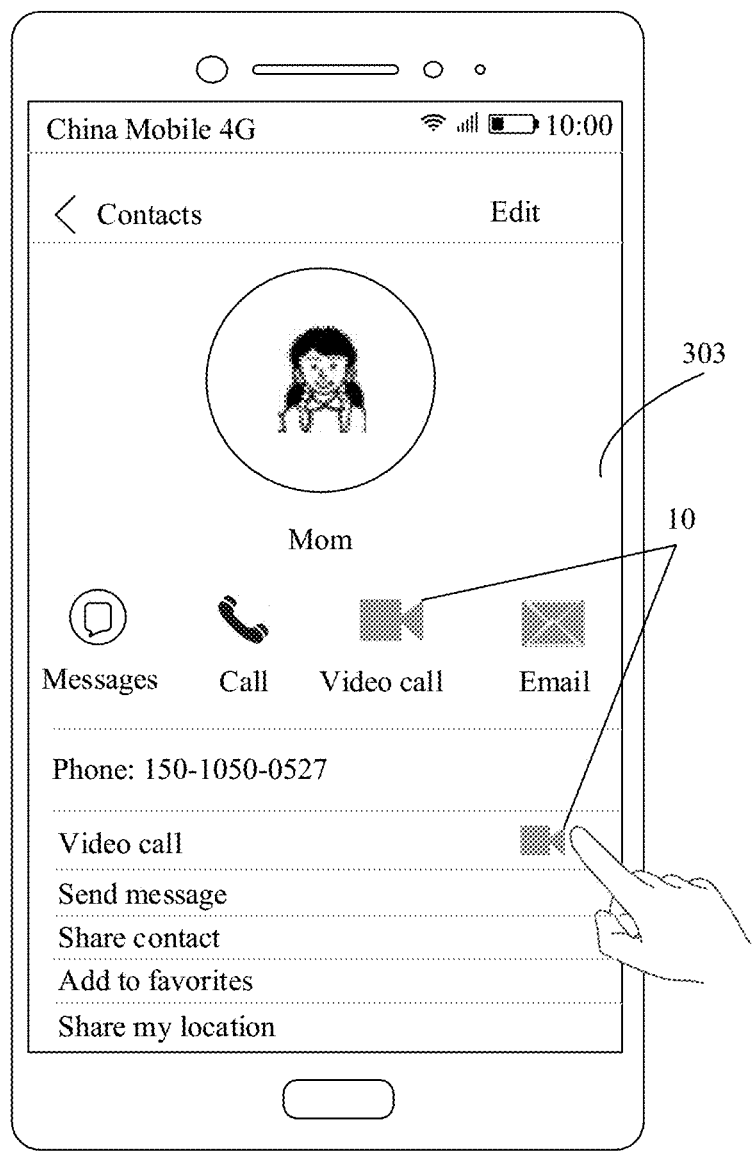

Different device forms or different user use scenarios need to meet different user requirements during a call service process. FIG. 3(a) to FIG. 3(c) are a schematic diagram of graphical user interfaces (GUIs) of an address book-based audio and video communication method according to an embodiment of this application. In this application, a mobile phone is used as an electronic device to describe in detail an address book-based device discovery method provided in this application. FIG. 3(a) shows that in an unlocking mode of the mobile phone, a screen display system of the mobile phone displays currently output interface content 301. The interface content 301 is a home screen of the mobile phone. The interface content 301 displays a plurality of third-party applications (Apps), for example, Address book, Messages, and Contacts. It should be understood that the interface content 301 may further include more applications. This is not limited in this application.

In an existing call service, a user can make a call to a contact based on the address book. As shown in FIG. 3(a), the user taps a "Contacts" application icon, and in response to the tapping operation of the user, the mobile phone enters an address book interface 302 shown in FIG. 3(b). The address book interface 302 may include a contact list. If the user taps a list bar corresponding to "mom", the mobile phone displays an interface 303 shown in FIG. 3(c). The interface 303 includes the address book information of the contact "mom", for example, a phone number and an avatar shown in FIG. 3(c). The interface 303 further includes a shortcut menu list, for example, different menu options such as "Video call", "Send message", "Share contact", "Add to favorites", and "Share my location". The user may tap different menu options based on a use requirement, to implement different functions.

For example, the user may perform an operation of tapping a "video call icon 10" shown in FIG. 3(c), and in response to the tapping operation of the user, the mobile phone initiates a video call request to "mom". The foregoing describes a process in which the user initiates a video call. In the process, a call request or a video call request for another user is implemented only by using the address book of the mobile phone, and a call request or a video call request cannot be initiated between a plurality of different devices.

It should be understood that the user may initiate a video call request to the "mom" user by tapping any "video call icon 10" shown in FIG. 3(c). This is not limited in this application.

In addition, in addition to relying on a carrier to initiate a call request or a video call request to another user, some current solutions also support presenting a facetime service in the address book of the mobile phone. The user sets a same phone number, email account, or the like on an associated device such as a mobile phone and a PAD, so that the associated device such as the mobile phone, a watch, or the PAD of the user may be dialed by using one device, and a plurality of associated devices may ring simultaneously.

It should be understood that in this application, simultaneous ringing may be understood as that the associated devices vibrate simultaneously. For example, when there is an incoming call, the mobile phone and the watch of the user vibrate simultaneously, to alert the user of the current incoming call, and after the user answers the call by using any one of the associated devices, calling to other associated devices is stopped.

It should be further understood that a simultaneous ringing state is not limited to alerting the user in a manner of vibration, and may be further alerting the user in a manner of ringing or ringing and vibration. This is not limited in this application.

It can be learned from the foregoing that the existing solution provides only a call service of a mobile device. When a call is made to a personal device, the associated devices may ring simultaneously. However, this solution is not extended to a home device, for example, a home shared device such as a speaker or a television. In addition, the solution lacks ecosystem scalability and cannot support new devices to be available in the future, such as vehicle-mounted devices and drones.

Therefore, this application provides an address book-based device discovery method, so that the personal devices and the home devices of the user can be discovered based on an address book, and the call service of a mobile device can be extended to a home device, thereby improving user experience.

Figure 4A:
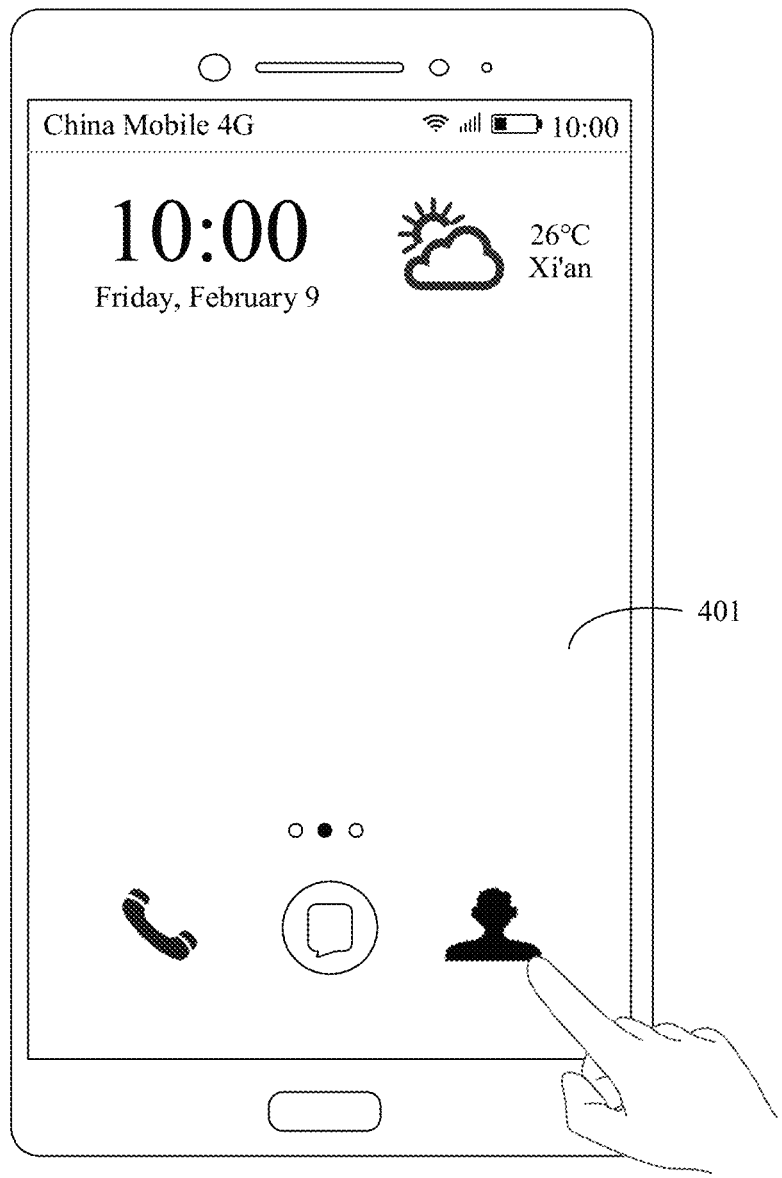
FIG. 4(a) to FIG. 4(e) are a schematic diagram of graphical user interfaces of another audio and video communication method according to an embodiment of this application.

FIG. 4(a) to FIG. 4(e) are a schematic diagram of user interfaces of an address book-based audio and video communication method according to an embodiment of this application. FIG. 4(a) shows that in an unlocking mode of a mobile phone, a screen display system of the mobile phone displays a currently output home screen 401 of the mobile phone. The home screen 401 may include a plurality of Apps. This is not limited in this application.

Figure 4B:
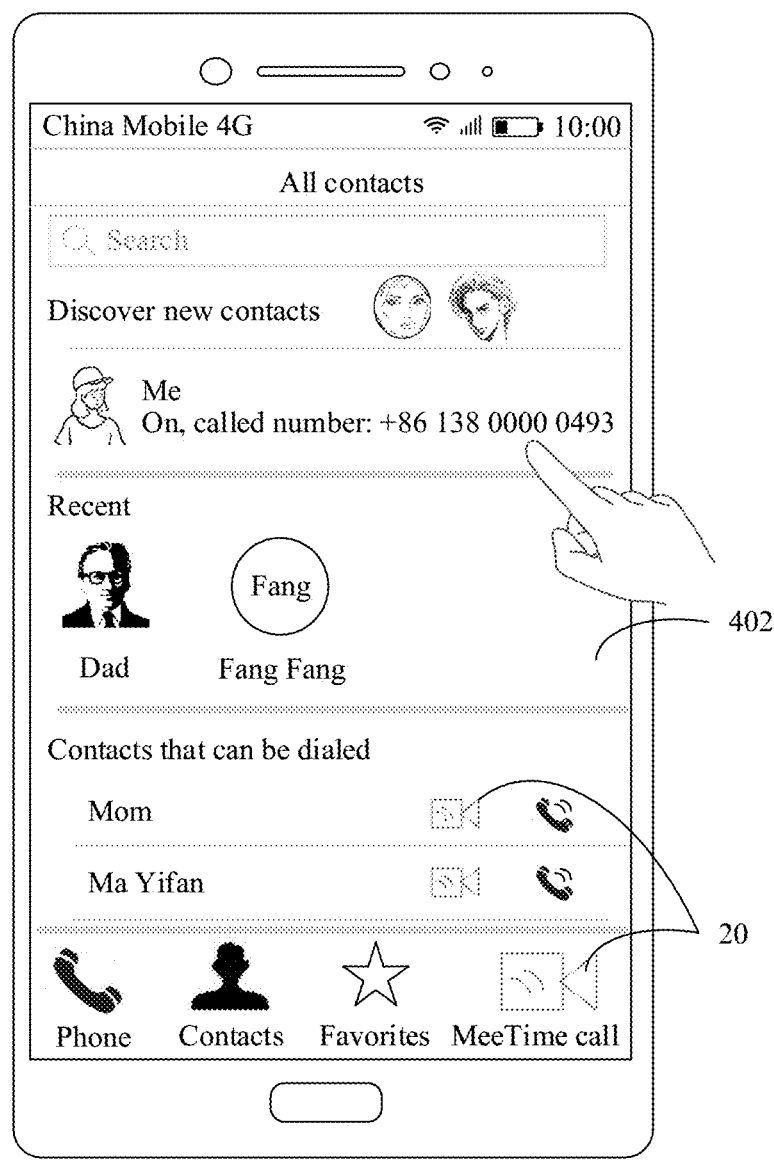

As shown in FIG. 4(a), a user taps a "Contacts" application icon, and in response to the tapping operation of the user, the mobile phone enters an address book interface 402 shown in FIG. 4(b). According to the method provided in this application, on the address book interface 402, in a lower menu bar, in addition to menus of Phone, Contacts, and Favorites, this application may provide the user with a "MeeTime call" menu, for example, a MeeTime call icon 20 shown in FIG. 4(b).

Optionally, when the MeeTime call icon 20 exists in the lower menu bar on the address book interface 402, the user taps the MeeTime call icon 20, so that the address book interface 402 of the mobile phone may display only a contact list that supports a MeeTime call function.

Optionally, the MeeTime call icon 20 may further exist in the contact list, for example, the MeeTime call icon 20 included after a "mom" option in contacts that can be dialed. The user taps the MeeTime call icon 20 that is included after the "mom" option, to directly and quickly enable the MeeTime call function, and initiate a video call request to "mom".

It should be understood that the "MeeTime call" function provided in this application is used to implement audio and video communication between a plurality of devices. For example, when the MeeTime call function is enabled, the user may perform audio and video communication between a personal device and a home device.

It should be further understood that an audio and video communication service in this application is a self-built IP service, and is different from a phone made on a carrier.

Figure 4C:
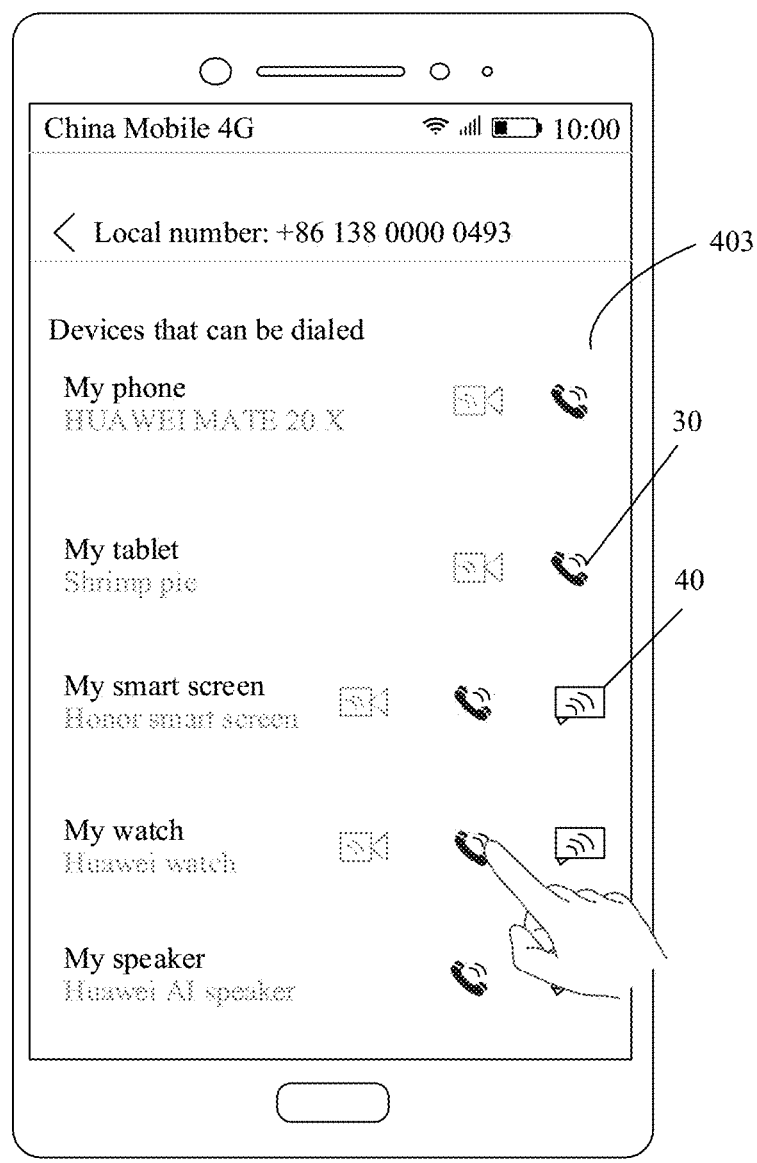
Figure 4D:
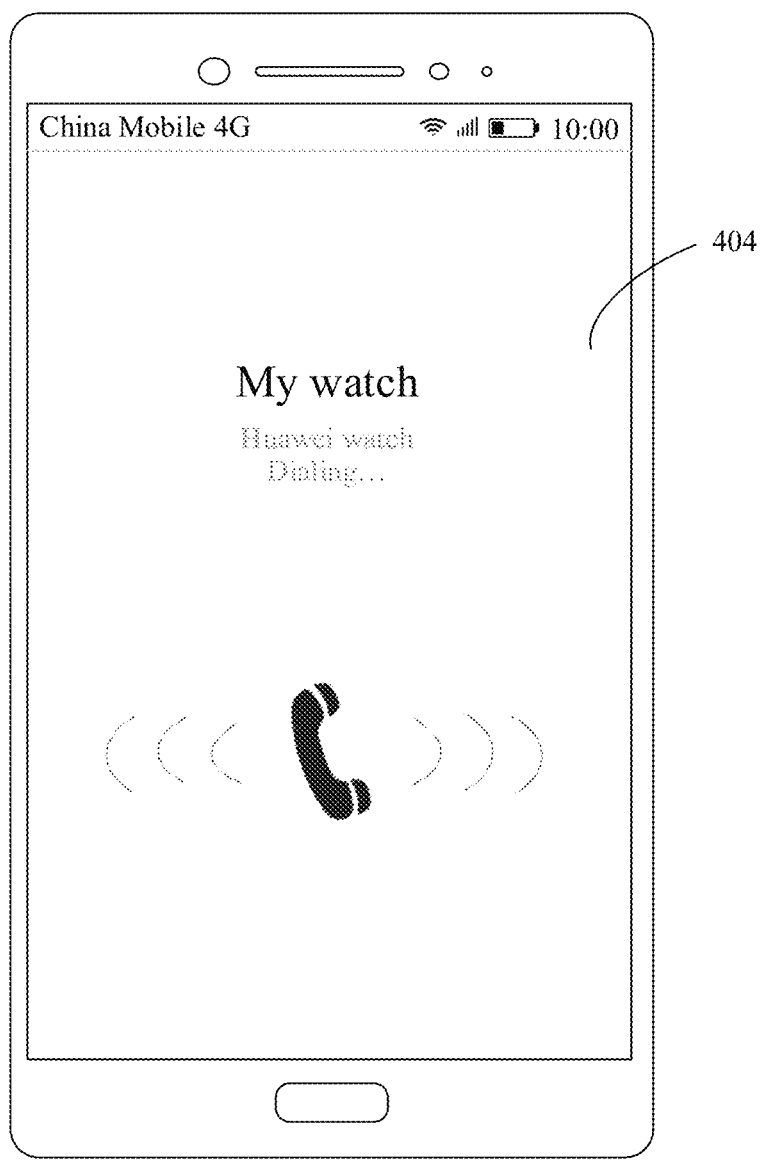
Figure 4E:
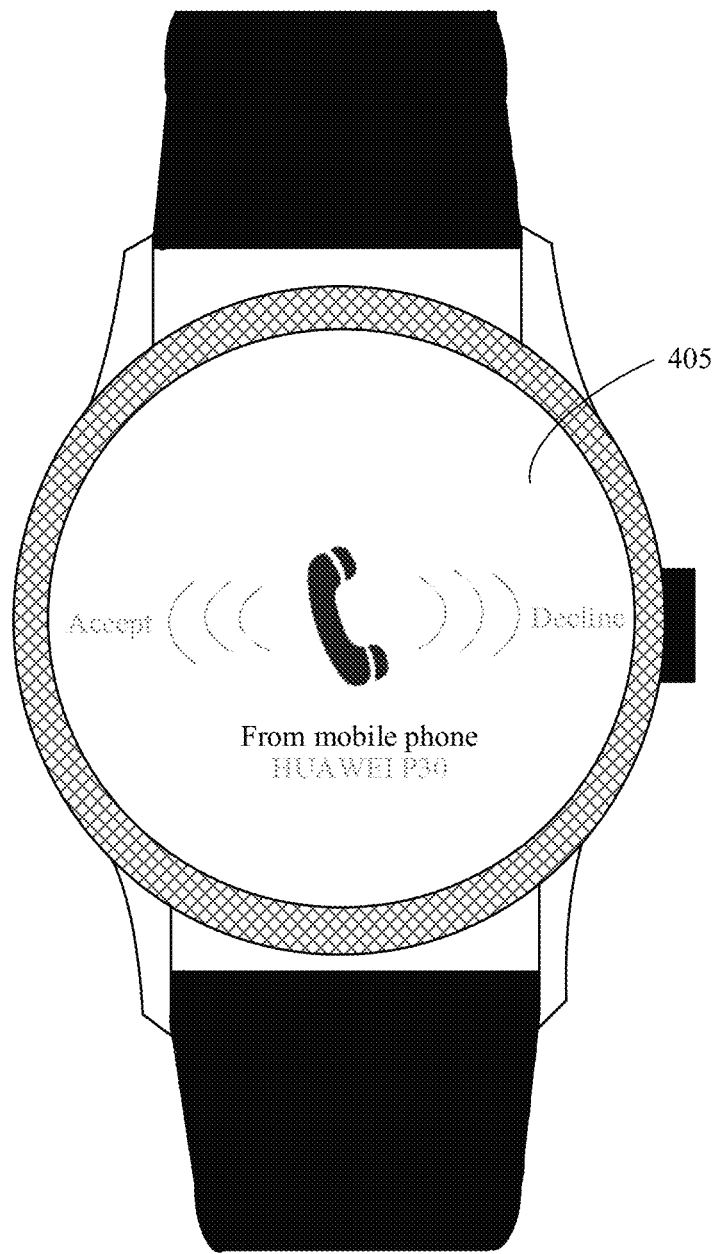

It should be further understood that, in this application, as shown in FIG. 4(c), an icon 30 is used to indicate that the device supports answering and making a call, an icon 40 is used to indicate that the device supports an audio call, and an icon 20 is used to indicate that the device supports a video call. A shape, a quantity, and an arrangement sequence of icons are not limited in this application.

The address book interface 402 of the mobile phone may further include information about an owner user, for example, "Me" shown in FIG. 4(b). The user taps a "Me" option, and the mobile phone displays a details interface 403 of the owner user shown in FIG. 4(c). On the interface 403, a plurality of devices in different forms that can be dialed by the owner/user may be displayed. For example, a current mobile phone is Huawei P30, and devices that can be dialed may include a mobile phone Huawei Mate 20 X, a tablet, a smart screen, a watch, a speaker, and the like. When the user taps a dialing icon of a "My watch" option shown in FIG. 4(c), in response to the tapping operation of the user, the mobile phone enters a call interface 404 shown in FIG. 4(d). Correspondingly, on the called watch end, a called interface 405 shown in FIG. 4(e) may be presented.

It should be understood that each device in a device list that is displayed on the interface 403 and that can be dialed by the owner/user may be added/edited. In a possible implementation, the user may edit and add corresponding device information on the mobile phone, which is similar to an operation of manually adding a contact by the user. For example, information about a device such as the tablet, the smart screen, the watch, or the speaker is added to the "Me" option. Details are not described herein again.

In another possible implementation, a dedicated App of different devices may be used to import information into the "Me" option. For example, a plurality of different devices may be registered by using a same phone number, in other words, devices such as the tablet, the smart screen, the watch, and the speaker correspond to a phone number of a "Me" user. The mobile phone may automatically discover information about the devices such as the tablet, the smart screen, the watch, and the speaker that all correspond to the same phone number, and automatically add the information to the list of devices that can be dialed.

Alternatively, when the plurality of different devices correspond to one manufacturer, for example, the tablet, the smart screen, the watch, and the speaker are all Huawei products, the user logs in with one Huawei enterprise account. In this case, the mobile phone may automatically discover information about devices such as the tablet, the smart screen, the watch, and the speaker that correspond to the same Huawei enterprise account, and automatically add the information to the list of devices that can be dialed. A quantity of devices included in the list of devices that can be dialed and a device adding manner are not limited in this application.

According to the method described in FIG. 4(a) to FIG. 4(e), a plurality of different devices of a same account, such as a personal device and a home device, may be discovered, and audio and video communication may be performed between the plurality of different devices associated with one account, so that an audio and video communication requirement of the user may be met in different scenarios.

For example, when the user wants to make a video call with a family member, the user may associate the home TV and the user mobile phone as devices under one account. The user may select a TV from the list of devices that can be dialed and tap "Video call" to send a video call request to the home TV, so as to make a video call with the family member on the TV. Alternatively, when the user cannot find the watch at home, the user may send a dialing service to the watch, and the watch alerts the user of an incoming call in a manner of vibration or ringing, so that the user can find the watch conveniently. Details are not described herein again.

It should be understood that, in this application, an account may be an account registered by using a phone number, or an enterprise account of a device manufacturer. This is not limited in this application.

Figure 5A:
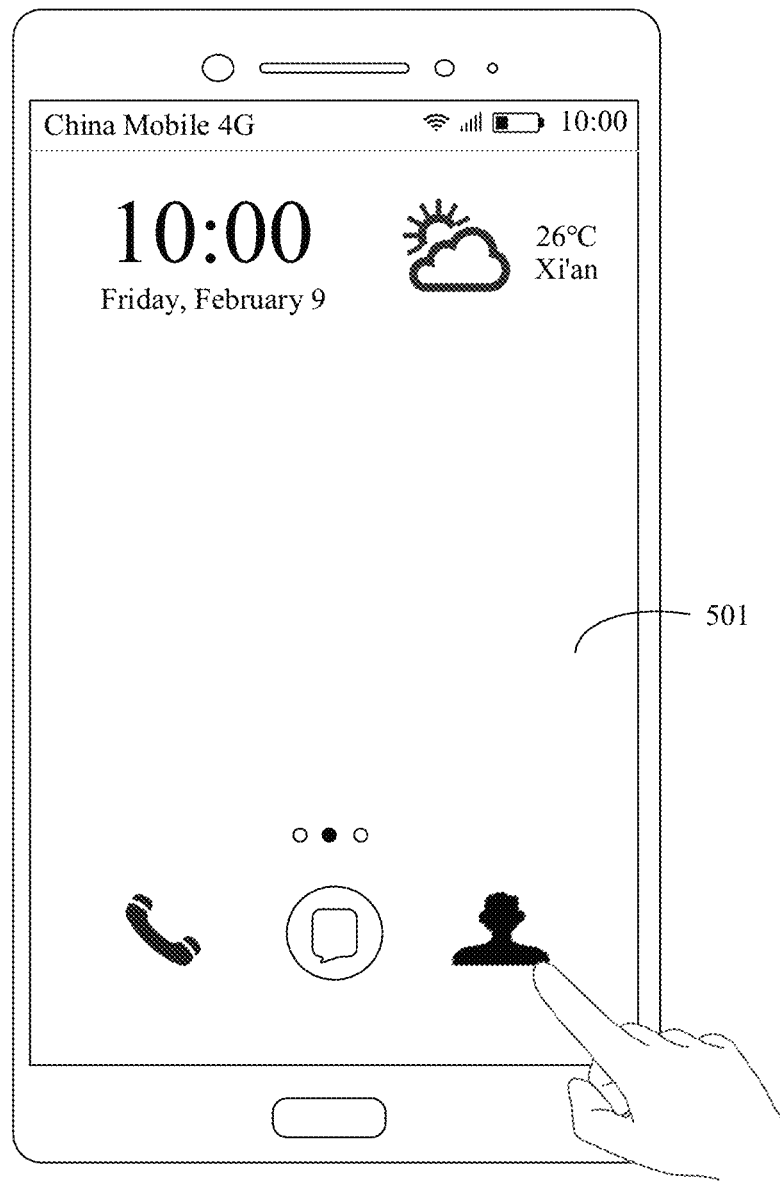
FIG. 5(a) to FIG. 5(e) are a schematic diagram of graphical user interfaces of another audio and video communication method according to an embodiment of this application.

FIG. 5(a) to FIG. 5(e) are a schematic diagram of user interfaces of another address book-based audio and video communication method according to an embodiment of this application. FIG. 5(a) shows that in an unlocking mode of a mobile phone, a screen display system of the mobile phone displays a currently output home screen 501 of the mobile phone. The home screen 501 may include a plurality of Apps. This is not limited in this application.

Figure 5B:

As shown in FIG. 5(a), a user taps a "Contacts" application icon, and in response to a tapping operation of the user, the mobile phone enters an address book interface 502 shown in FIG. 5(b). As shown in FIG. 5(b), the user taps a Contacts menu at the bottom of the interface 502, and the mobile phone displays an interface 503 of all contacts shown in FIG. 5(c).

The interface 503 includes information about a plurality of contacts. The plurality of contacts include a contact that can make a MeeTime call and a contact that cannot make a MeeTime call. A MeeTime call icon 20 may be displayed in a list of contacts that can make a MeeTime call. A contact list that does not display the MeeTime call icon 20 includes a contact that cannot make a MeeTime call. For example, if a list of "mom" and "Nana" includes the MeeTime call icon 20, "mom" and "Nana" are contacts that can make the MeeTime call.

It should be understood that, in this application, the contact that can make a MeeTime call may be a user of a MeeTime call service registered with or received by the contact. Optionally, when a user B taps the MeeTime call icon 20 in the lower right menu in FIG. 5(b) for the first time, the user authorizes the App to enable a MeeTime call function, or the user registers in the MeeTime call function. A cloud end or a server corresponding to the MeeTime call may obtain information about the user B, for example, registered phone number information, user name, and account information, so that the user B may be displayed in an address book list of a user A as the contact that can make the MeeTime call. This is not limited in this application.

Figure 5C:
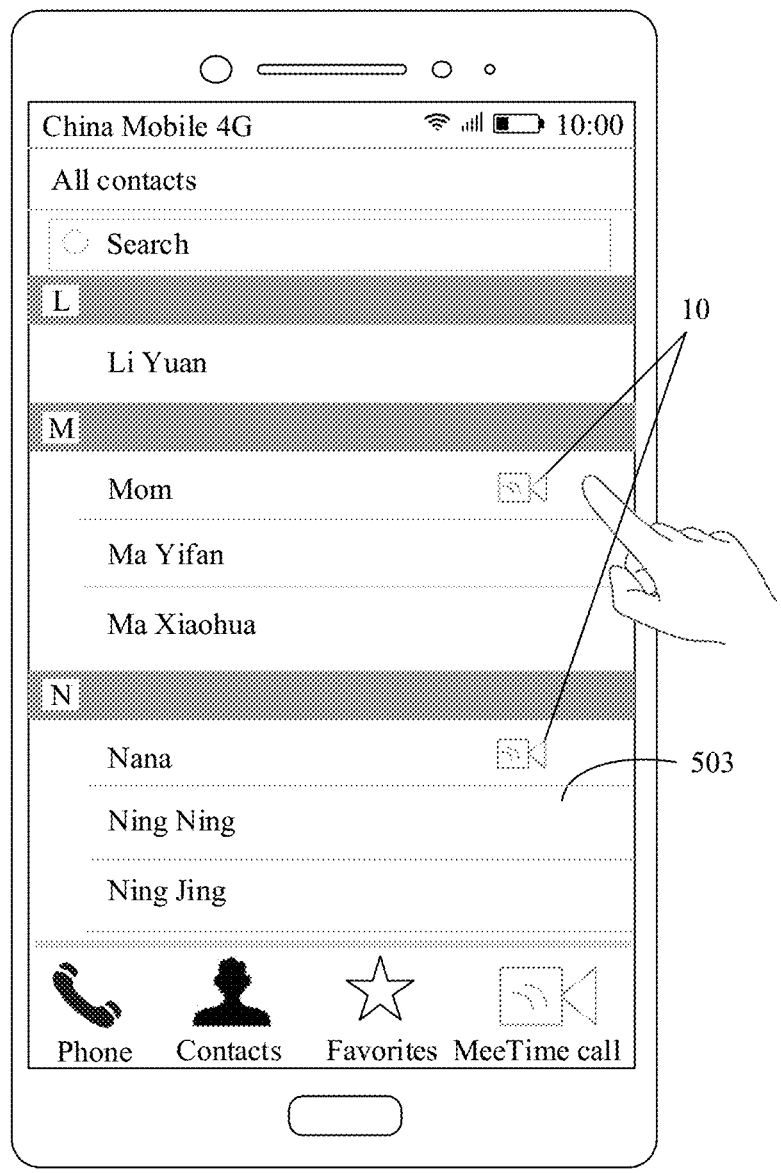
Figure 5D:
Figure 5E:
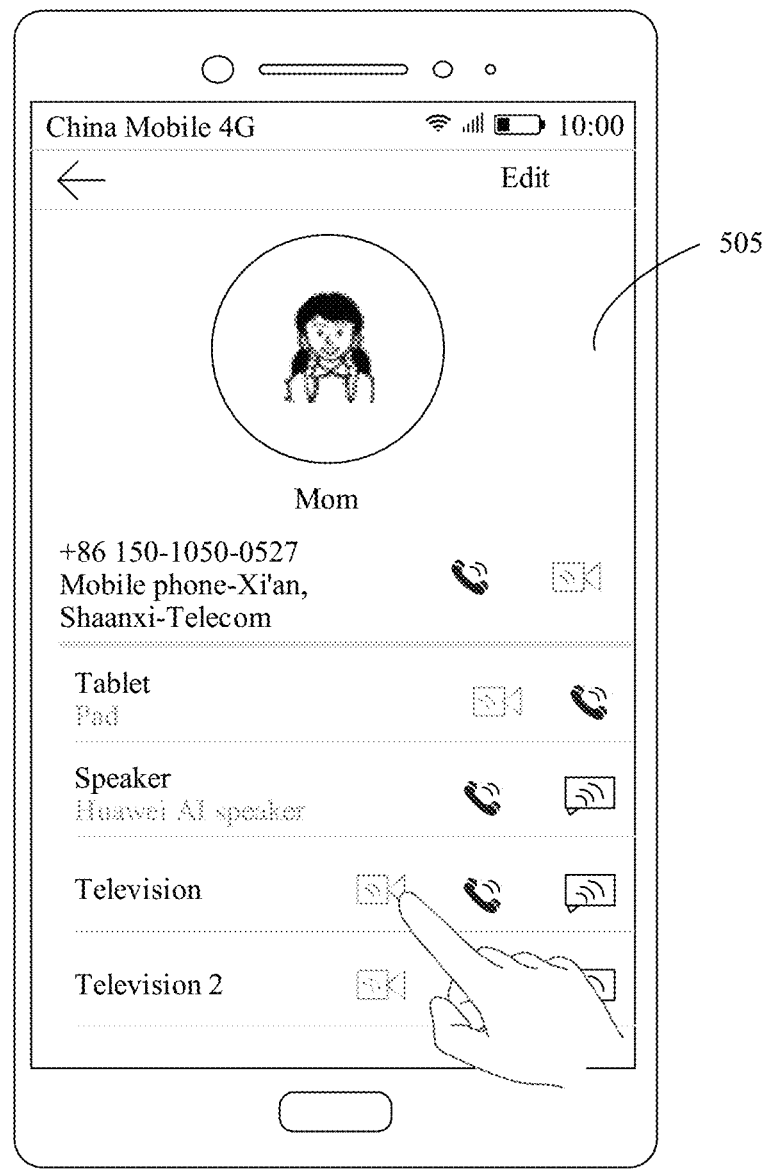

As shown in FIG. 5(c), the user taps a list bar of "mom", and the mobile phone displays an interface 504 shown in FIG. 5(d). The interface 504 includes the address book information of the contact "mom". The interface 504 may include a MeeTime call menu. When the user taps the MeeTime call menu, the mobile phone displays an interface 505 shown in FIG. 5(e). The interface 505 includes a plurality of different devices associated with "mom", for example, a tablet, a speaker, a television, and a television 2 of "mom". The tablet, the television, and the television 2 may support a video call, and the speaker may support an audio call. In this case, if the user wants to make a video call with "mom" on the television, as shown in FIG. 5(e), the user taps the MeeTime call icon 20 of the television option, to initiate a video call request to the television of "mom".

In a possible implementation, when the user initiates a call request to a personal device such as a tablet, a mobile phone B, or a watch by using a mobile phone A, the user may set the mobile phone A and the personal device such as the tablet, the mobile phone B, and the watch to a simultaneous ringing state. Therefore, when the user initiates a call request to any one of the personal devices such as the tablet, the mobile phone B, and the watch by using the mobile phone A, all the devices in the personal devices such as the tablet, the mobile phone B, and the watch vibrate, to remind the user that the call can be answered by using any one of the personal devices.

In another possible implementation, when the user initiates a call request to a home device such as a speaker or a television by using the mobile phone A, the mobile phone A and the home device such as the speaker or the television may be set to a non-simultaneous ringing state. Therefore, when the user initiates a call request to any one of home devices such as the speaker and the television by using the mobile phone A, only the device selected by the user to call vibrates, so as to alert the user to answer the call. Other home devices do not vibrate.

It should be understood that, because home devices have a stricter privacy policy, a home device may be set to the non-simultaneous ringing state. It should be further understood that the user may also set a personal device such as the tablet, the mobile phone B, or the watch to the non-simultaneous ringing state, and set the home device such as the speaker or the television to the simultaneous ringing state based on a personal use requirement. This is not limited in this application.

It should be understood that in this application, simultaneous ringing may be understood as that the associated devices vibrate simultaneously. For example, when there is an incoming call, the mobile phone and the watch of the user vibrate simultaneously, to alert the user of the current incoming call, and after the user answers the call by using any one of the associated devices, calling to other associated devices is stopped.

It should be further understood that the simultaneous ringing state is not limited to alerting the user in a manner of vibration, and may further include manners such as ringing or ringing and vibration. This is not limited in this application.

It should be further understood that in addition to simultaneous ringing, sequential ringing may be further included. Sequential ringing means that a first of a plurality of associated devices is called first in a call process, and when the first device does not answer within preset time, a second of the plurality of associated devices is called in a preset sequence, and so on. In addition, after the user answers the call by using any one of the associated devices, the user usually does not make a subsequent call to another associated device. This is not limited in this application.

According to the method described in FIG. 5(a) to FIG. 5(e), the mobile phone may discover, based on the address book, different devices of different accounts. For example, an address book of the user B is stored on a mobile phone of the user A, and the mobile phone of the user A may discover a personal device of the user B that supports the MeeTime call. Alternatively, after the user B discloses home device information, the mobile phone of the user A may also discover a home device of the user B that supports the MeeTime call. In this way, the user A may initiate audio and video communication requests to a plurality of different devices of the user B, so that audio and video communication requirements of the user can be met in different scenarios.

Optionally, the user B may set whether to disclose information about a plurality of devices associated with the user B.

For example, if the user B sets to disclose information about the plurality of devices associated with the user B, the mobile phone of the user A may discover the plurality of devices associated with the user B. The mobile phone of the user A may display "discovering a newly enabled contact" shown in FIG. 4(b), and add the plurality of devices associated with the user B to an interface of the list of devices that can be dialed shown in FIG. 4(c).

Alternatively, the user B sets to disclose information about some devices associated with the user B. For example, only information about a personal device of the user B is disclosed. The mobile phone of the user A can discover only the information about the personal device of the user B, and add the personal device associated with the user B to the interface of the list of devices that can be dialed shown in FIG. 4(c).

Alternatively, the user B sets to disclose information about some home devices of the user B, for example, disclose only information about a speaker associated with the user B. The mobile phone of the user A can discover only information about the speaker of the user B, and add the speaker associated with the user B to the interface of the list of devices that can be dialed shown in FIG. 4(c). This is not limited in this application.

It should be understood that the foregoing different implementations may be controlled by using a device-specific App of each device. For example, when the user B initially logs in to a smart screen device, the user B needs to register or log in to the smart screen by using an App unique to the smart screen. The user B may further establish a device address book for the smart screen. The device address book is only for the smart screen device of the user B. Only when the user authorizes to import the device address book of the smart screen to a mobile phone of the user B, the user B can view the address book of the smart screen of the user B from the mobile phone and determine whether the address book contains information about another device such as a speaker and a tablet of the user B.

In addition, the foregoing smart screen is for a private user, and the user B may share the device address book in a plurality of electronic devices such as the tablet, the mobile phone, and the speaker of the user B. A majority of smart screen devices of enterprises are purchased for performing a video conference. Therefore, the smart screen address book may be set, in a unique control App corresponding to the smart screen, to be visible to all, or visible to a specified address book, or invisible to all. This is not limited in this application.

In the foregoing method, the user may set permissions based on different use requirements, so that when being discovered by another device, privacy requirements of different devices during use processes in different scenarios are met.

In conclusion, the mobile phone of the user A is used as the center, the mobile phone may find the call service, the personal device, the home device, and the like in the address book, and may not only make a call to each device of the user (user A), but also call another contact (user B) or the home device of the user B. This method not only inherits an address book-based call habit of the user, but also provides easy-to-use and easy-to-expand device access capabilities for an internet of everything 5G era, improving user experience.

In addition, in a registration process, the personal device and the home device may use a same account, for example, bind a same phone number or use a same enterprise account, so as to discover the personal device and the home device that support the call service. In addition, a list of call services, personal devices, and home devices is presented in the address book of the mobile phone. The process is easy-to-operate and easy-to-evolve and improves user experience.

With reference to the foregoing embodiments and related accompanying drawings, the embodiments of this application provide the address book-based device discovery method and the audio and video communication method. The methods may be implemented by the electronic devices (for example, a mobile phone or a tablet computer) having the touchscreen and the camera shown in FIG. 1 and FIG. 2.

Figure 6:
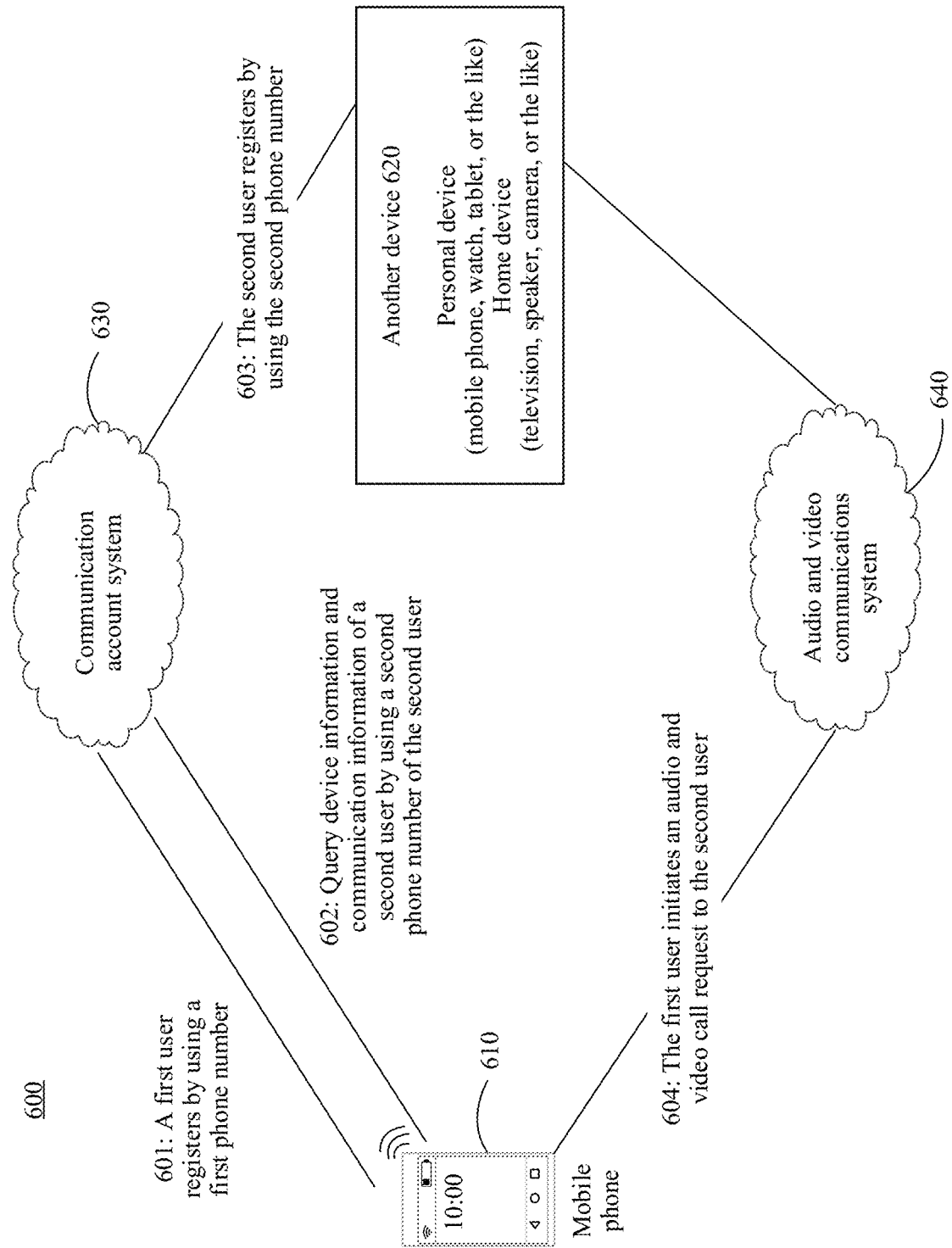
FIG. 6 is a schematic diagram of a system architecture according to an embodiment of this application.

To implement the address book-based device discovery method and the audio and video communication method described in FIG. 4(a) to FIG. 4(e) and FIG. 5(a) to FIG. 5(e), a connection architecture between a plurality of modules needs to be established. FIG. 6 is a schematic diagram of a system architecture according to an embodiment of this application. As shown in FIG. 6, the architecture 600 includes a mobile phone 610, another device 620, a communication account system 630, and an audio and video communications system 640. The mobile phone 610 may include a mobile phone of a user A and a mobile phone of a user B. In this implementation, it is assumed that the user A and the user B are an address book contact of each other. Specifically, details are as follows:

601: A first user performs account registration with the communication account system 630 by using a first phone number of the first user.

602: Query device information and communication information of a second user by using a second phone number of the second user.

603: The second user performs account registration with the communication account system 630 by using the second phone number of the second user.

604: The first user initiates an audio and video call request to the second user by using the audio and video communications system.

It should be understood that this implementation can be implemented provided that a device can be connected to a network.

It should be further understood that, after the first user performs registration by using the first phone number, and the second user performs registration by using the second phone number, both the first user and the second user enable an audio and video communication capability.

For example, a personal device of the second user may include a mobile phone, a watch, or the like. For example, when the first user initiates a call request to a mobile phone of the second user, the first user first sends a request for calling the personal device of the second user to the audio and video communications system, and the audio and video communications system initiates a call request to the mobile phone of the second user.

For example, the account list information may include the following content.

As shown in Table 1, in a process in which the first user and the second user register with the communication account system, the account list information may be stored in the communication account system. The account list information may include the account information of each user, the device identifiers of M devices associated with each account, the communication identifiers of the M devices, communication policies of the M devices, and the like, where M is a positive integer.

It should be understood that the account information of the user may be a phone number of the user, that is, a phone number of the user during registration, and is used as an identifier discovered during communication. The device identifier may be a physical identifier of each device, and is used to distinguish different devices. The communication identifier is a communication ID allocated by the communication account system, for example, "000 000 000 001", and is used to accurately send a call request. The communication policy may be the foregoing information such as resonance, for example, performing resonance on the M devices during an audio and video call. Details are not described herein again.

TABLE 1

| Huawei ID | Device | Communication ID | Identification of communication discovery |
|---|---|---|---|
| First user | Mobile phone 1 | 000 000 000 001 | 150 1050 0527 |
|  | Mobile phone 2 | 000 000 000 002 |  |
|  | Television | 000 000 000 003 | 138 1050 0611 |
|  | Speaker | 000 000 000 004 | 132 0000 0021 |
|  | Watch | 000 000 000 005 | 132 0000 0029 |
| Second user | Mobile phone | 000 000 000 006 | 138 5201 1050 |
|  | Smart screen | 000 000 000 007 | 132 0000 1520 |

In the foregoing solution, first, one or more personal devices of the user are registered with the communication account system by using a phone number, to enable a communication capability of the user. If device discovery needs to be performed in one address book entry, a plurality of devices of the second user may use a same phone number for registration. After registration, the communication account system is responsible for maintaining a binding relationship between the device and the phone number for capability discovery and query.

Figure 7A:
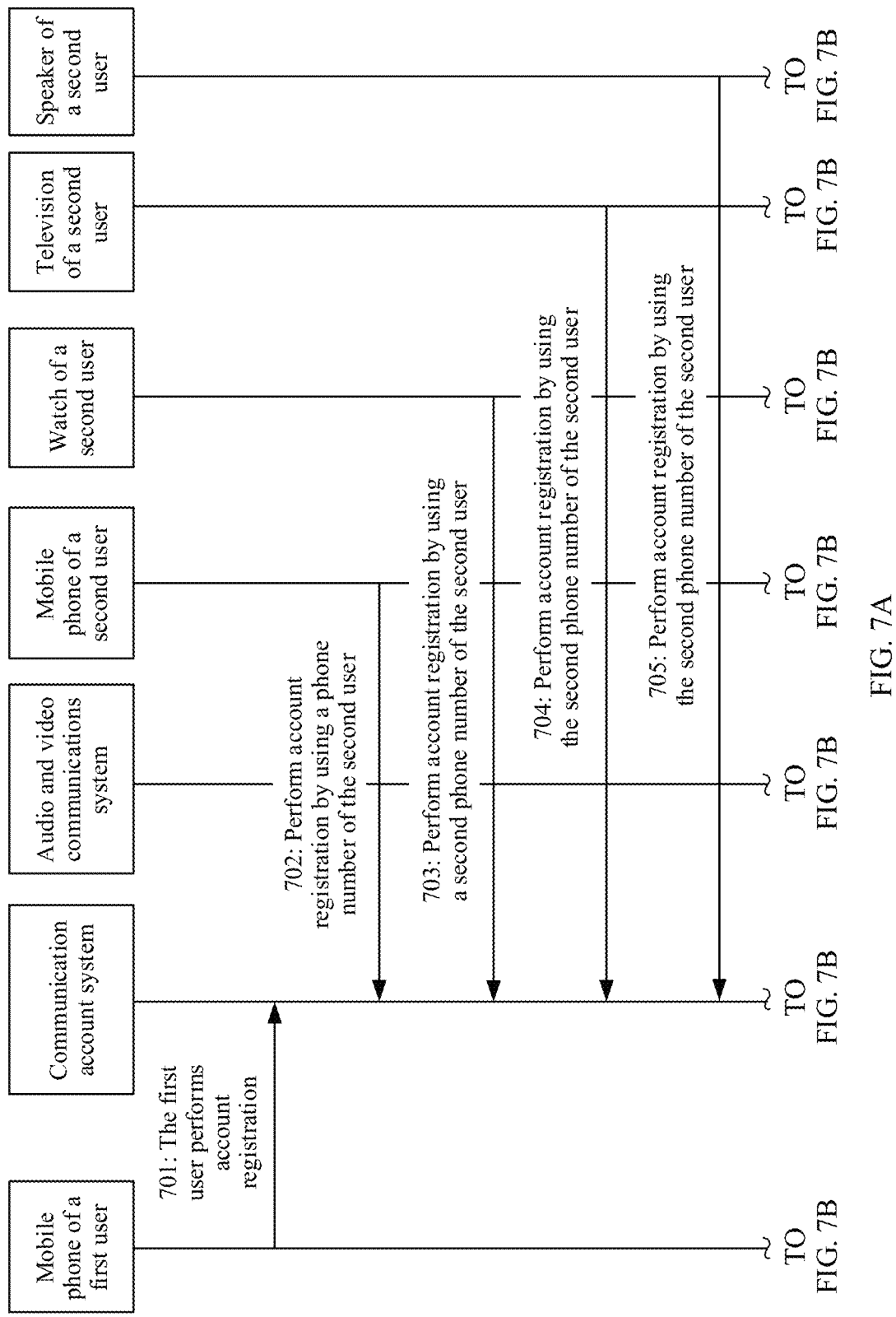
FIG. 7A and FIG. 7B are a schematic interaction diagram of an audio and video communication method according to an embodiment of this application.
Figure 7B:
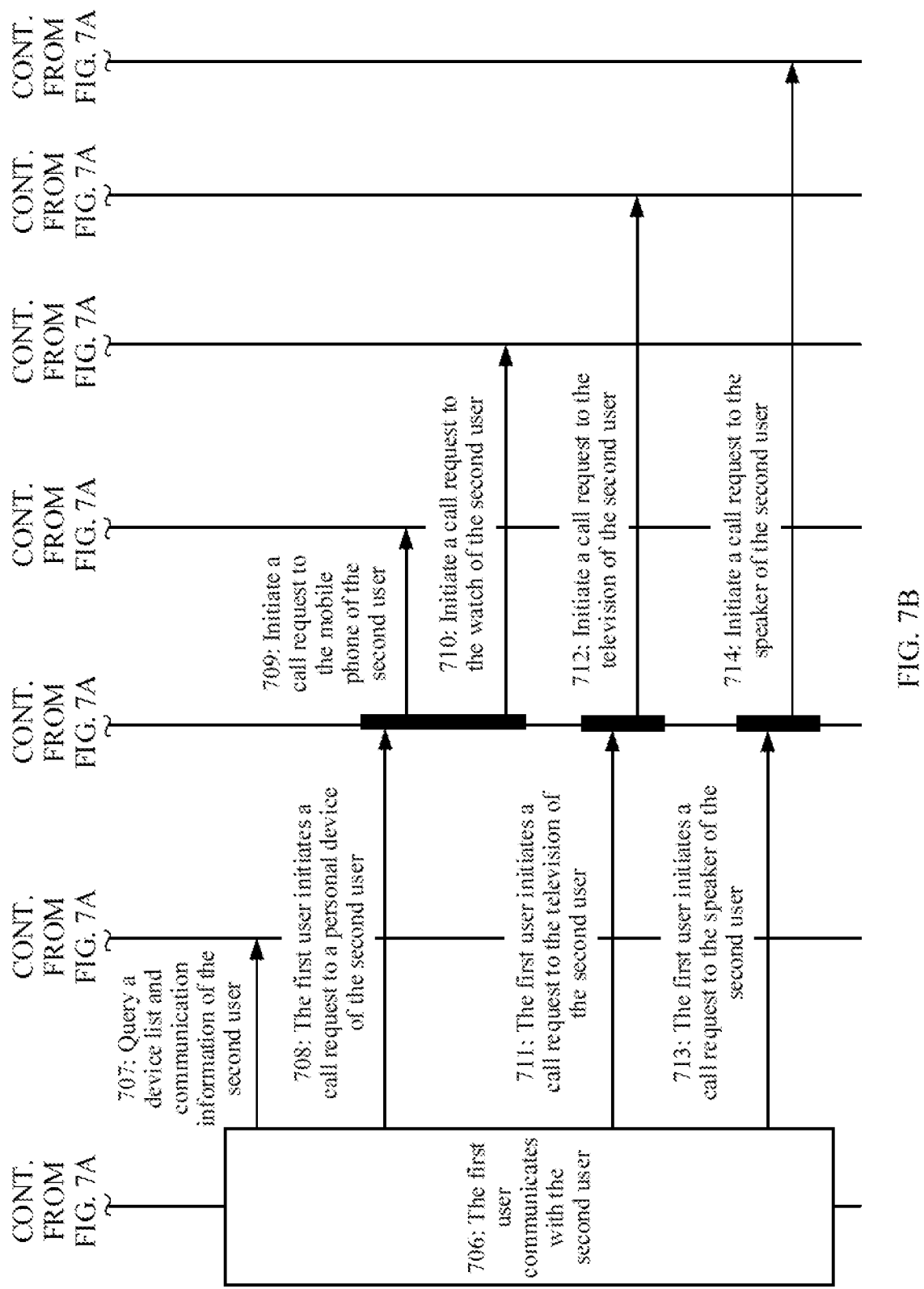

FIG. 7A and FIG. 7B are a schematic interaction diagram of an audio and video communication method according to an embodiment of this application. As shown in FIG. 7A and FIG. 7B, the method may include the following steps:

701: A first user performs account registration with a communication account system. Optionally, a first account may be registered by using a first phone number of the first user.

702: A second user performs account registration with the communication account system. Similarly, the second user may perform registration by using a second phone number of the second user.

It should be understood that, after the first user performs registration by using the first phone number, and the second user performs registration by using the second phone number, both the first user and the second user enable an audio and video communication capability.

703: A watch of the second user performs account registration with the communication account system by using the second phone number of the second user.

704: A television of the second user performs account registration with the communication account system by using the second phone number of the second user.

705: A speaker of the second user performs account registration with the communication account system by using the second phone number of the second user.

706: The first user opens an address book, and communicates with the second user.

707: The first user queries a device list and communication information of the second user based on the second phone number of the second user in the address book of the first user.

For example, as shown in FIG. 5(*e*), "mom" serves as the second user, and the second phone number is stored in the address book of the first user. The device list of the second user may be determined by querying information about the second user in the address book of the first user. For example, in FIG. 5(*e*), it may be found in the information about "mom" that the tablet, the speaker, the television, and the television 2 of "mom" may all support the MeeTime call, and the first user may perform audio and video communication with any one of the devices.

708: The first user initiates a call request to a personal device of the second user. First, the first user sends a request to call the personal device of the second user to an audio and video communications system.

For example, the personal device of the second user may include a mobile phone, a watch, or the like. For example, when the first user initiates a call request to the mobile phone of the second user, the first user first sends a request to call the personal device of the second user to the audio and video communications system, and then performs step 709. The audio and video communications system initiates a call request to the mobile phone of the second user.

Alternatively, when the first user initiates a call request to the watch of the second user, the first user first sends a request to call the personal device of the second user to the audio and video communications system, and then performs step 710. The audio and video communications system initiates a call request to the watch of the second user.

It should be understood that the first user initiates a call request, or referred to as a call service (Hi call), to a device of the second user by using the audio and video communications system. The call service does not need to use a carrier communications system. When a network is connected, the call service may be initiated by using the system architecture 600 described in FIG. 6.

It should be further understood that, because a personal device of a user is generally a mobile device, a universal call service may be provided. In other words, the first user and the second user only need to successfully answer one call, and may answer the call by using any personal device. Therefore, the personal device of the second user may be set to a simultaneous ringing state. When the first user sends the request for calling the personal device of the second user to the audio and video communications system, a same request message may be reused. This is not limited in this application.

In addition, when the first user initiates a call request to a home device of the second user, where the home device may include a television, a speaker, and the like, because a home device is a fixed device, is generally used to make a call between close users, and has a relatively high privacy requirement, the home device is set to a non-simultaneous ringing state by default. When sending a request for calling the home device of the second user to the audio and video communications system, the first user separately sends request messages for different home devices to the audio and video communications system.

711: The first user initiates a call request to the television of the second user. First, the first user sends a request for calling the television of the second user to the audio and video communications system.

712: The audio and video communications system then initiates a call request to the television of the second user.

713: Alternatively, the first user initiates a call request to the speaker of the second user. First, the first user sends a request for calling the speaker of the second user to the audio and video communications system.

714: The audio and video communications system then initiates a call request to the speaker of the second user.

In the foregoing solution, first, one or more personal devices of the user are registered with the communication account system by using a phone number, to enable a communication capability of the user. If devices need to be discovered in one address book entry, a plurality of devices of the user may use a same phone number for registration. When a device registers with the communication account system by using the phone number, security authentication can be performed using an SMS authentication code or using a password-free one-click login provided by a third-party enterprise (such as a carrier). This improves the security of the registration process. After registration, the communication account system is responsible for maintaining a binding relationship between the device and the phone number for capability discovery and query.

In a process in which the first user dials audio and video communication to a device of the second user, a list of devices that meet a privacy policy needs to be first queried based on the second phone number of the second user, and a list of devices that are enabled to dial audio and video communication needs to be presented in an address book. Then, the first user may dial the personal devices of the second user by using the call service, and the personal devices can ring simultaneously. Alternatively, the first user may directly dial the home device of the second user, such as the speaker or the television.

To enable a home device in a high privacy scenario, such as a television or a speaker, to be discovered and called in the address book of the first user, a clear privacy policy needs to be formulated. For example, the television has its own device address book, and only when the first user is in the device address book of the television, the television can be found in the address book of the first user and an audio and video call request can be initiated to the television.

In the foregoing solution, a call service may be provided based on an address book, so that calls can be made to different devices of a same user, and the call service may be extended to a home device, a vehicle-mounted device, or even more 5G communications devices in a high-privacy scenario, so as to implement one-click discovery, dialing, and call services, provide easy-to-use communication solutions for different use scenarios, and improve user experience.

In another possible implementation, when registering with the communication account system, the first user and the second user may perform registration by using a phone number, or may perform registration by using another account, a user name, or the like. Herein, the first phone number, another account, user name, or the like may be used to uniquely determine the first user or the second user. This is not limited in this application.

For example, if the third-party enterprise (such as a mobile phone manufacturer) or a service provider has a complete account system, the audio and video communication capability is only a new service and can be integrated with an existing account system. Specifically, before a device performs registration, the device logs in to a third-party account system to obtain symbols or identifiers (tokens) for different users. Then, the device registers with the communication account system and completes identifier authentication of different users on a cloud side. That is, the authentication standard of OAuth2.0 is met.

In this embodiment, the first user, the second user, the devices of the first user, and the devices of the second user all have corresponding registrations in the third-party account system, and different users have different user identifiers in the third-party account system.

Figure 8A:
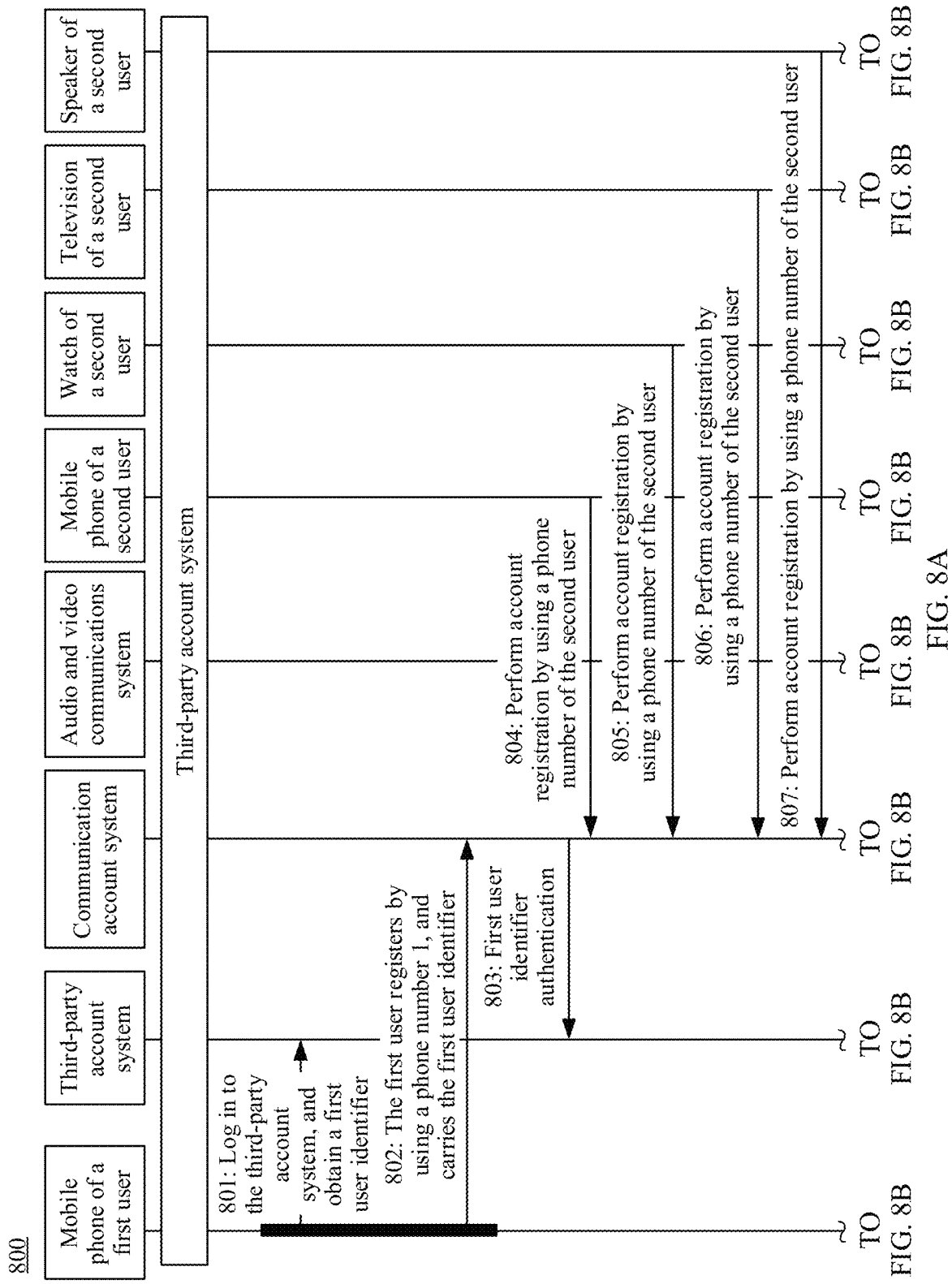
FIG. 8A and FIG. 8B are a schematic interaction diagram of another audio and video communication method according to an embodiment of this application.
Figure 8B:
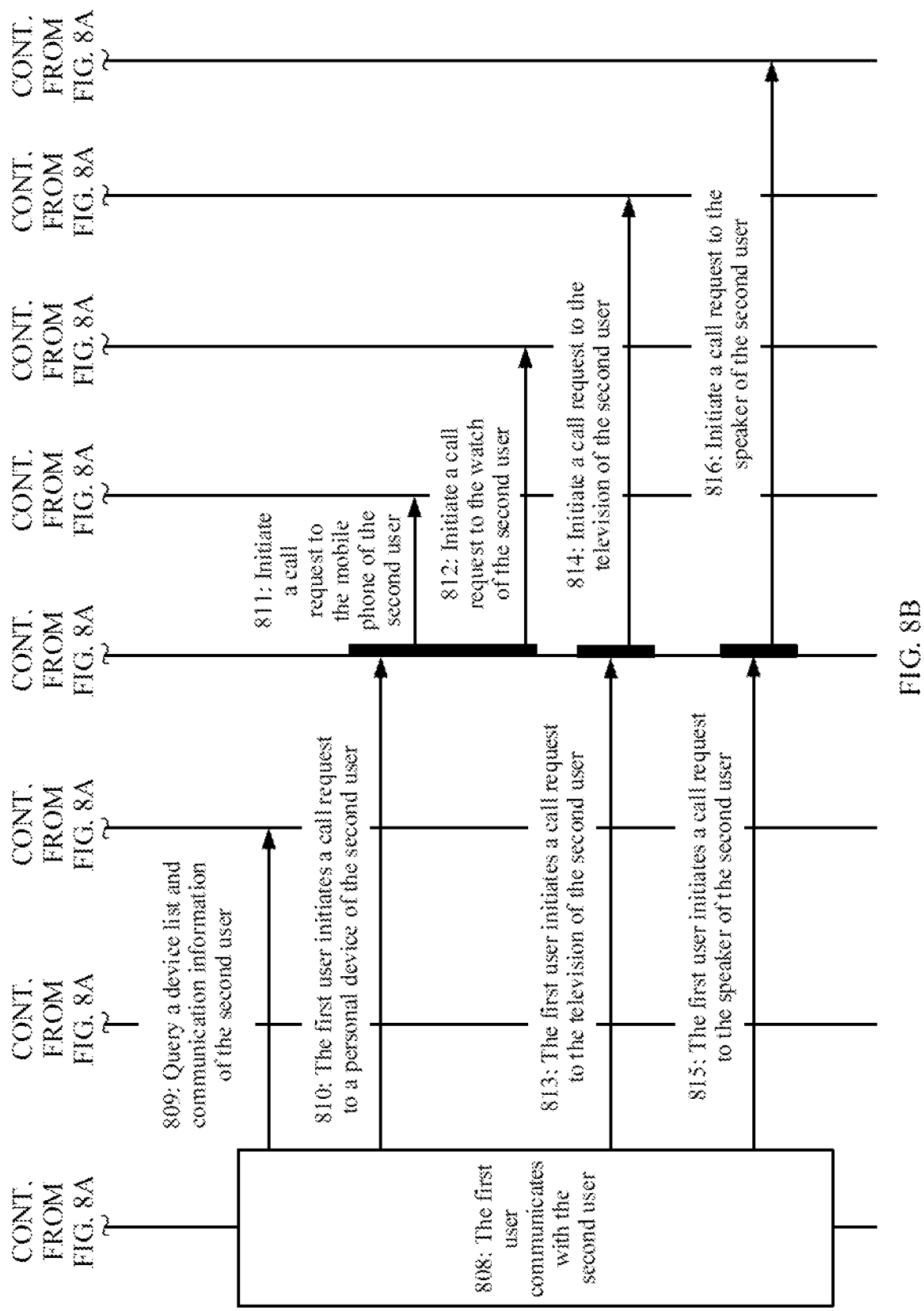

FIG. 8A and FIG. 8B are a schematic interaction diagram of another audio and video communication method according to an embodiment of this application. As shown in FIG. 8A and FIG. 8B, the method may include the following steps:

801: A first user logs in to a third-party account system to obtain a first user identifier.

802: The first user performs account registration with a communication account system by using a first phone number, and carries the first user identifier.

803: The communication account system performs user authentication on the third-party account system to determine the first user identifier.

804: A mobile phone of a second user performs account registration with the communication account system by using a second phone number of the second user.

805: A watch of the second user performs account registration with the communication account system by using the second phone number of the second user.

806: A television of the second user performs account registration with the communication account system by using the second phone number of the second user.

807: A speaker of the second user performs account registration with the communication account system by using the second phone number of the second user.

It should be understood that, through the foregoing steps, registration in the third-party account system is unified with registration of a user in the communication account system by using a phone number. If a third-party account has been registered using the phone number, an audio and video communication function may also directly obtain the phone number to complete device-cloud verification. In this way, processes such as entering the phone number and SMS authentication are saved, which facilitates user operations and improves user experience.

In addition, steps 808 to 816 are device discovery and call processes, which are the same as steps 706 to 714 in Example 1. Refer to the foregoing description. Details are not described herein again.

In the foregoing solution, the registration of the user in the third-party account system is first unified with the registration of the user in the communication account system by using the phone number, to enable a communication capability of the user. If a plurality of devices of a same user are registered by using a same phone number for registration, the devices can be discovered in one address book entry for capability discovery and query.

In a process in which the first user dials audio and video communication to a device of the second user, a list of devices that meet a privacy policy needs to be first queried based on the second phone number of the second user, and a list of devices that can dial audio and video communication needs to be presented in an address book. Then, the first user may dial a personal device of the second user by using a call service, and the personal device can ring simultaneously. Alternatively, the first user may directly dial a home device of the second user, such as a speaker or a television.

To enable a home device in a high privacy scenario, such as a television or a speaker, to be discovered and called in an address book of the first user, a clear privacy policy needs to be formulated. For example, the television has its own device address book, and only when the first user is in the device address book of the television, the television can be found in the address book of the first user and an audio and video call request can be initiated to the television.

In the foregoing solution, a call service may be provided based on an address book, so that calls can be made to different devices of a same user, and the call service may be extended to a home device, a vehicle-mounted device, or even more 5G communications devices in a high-privacy scenario, so as to implement one-click discovery, dialing, and call services, provide easy-to-use communication solutions for different use scenarios, and improve user experience.

It may be understood that, to implement the foregoing functions, the electronic device includes corresponding hardware and/or software modules for performing the functions. With reference to the algorithm steps of each example described in the embodiments disclosed in this specification, the methods and apparatus may be implemented in a form of hardware or a combination of hardware and computer software. Whether a function or module is performed or implemented by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into function modules based on the foregoing method examples. For example, each function module corresponding to each function may be obtained through division, or two or more functions may be integrated into one processing module. The integrated module may be implemented in a form of hardware. It should be noted that the module division in the embodiments is an example, and is merely logical function division. In an actual implementation, another division manner may be used.

Figure 9:
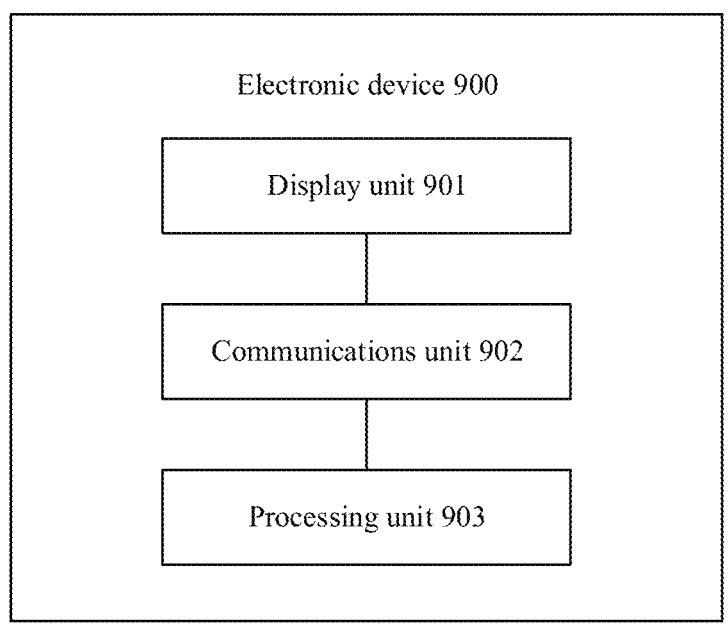
FIG. 9 is a schematic diagram of a possible composition of an electronic device according to an embodiment of this application.

When each function module corresponding to each function is obtained through division, FIG. 9 is a schematic diagram of possible composition of an electronic device 900 in the foregoing embodiments. As shown in FIG. 9, the electronic device 900 may include a display unit 901, a communications unit 902, and a processing unit 903.

The display unit 901, the communications unit 902, and the processing unit 903 cooperate, and may be configured to support the electronic device 900 in performing the steps and the like in the foregoing methods 700 and 800, and/or are used in another process of the technology described in this specification.

It should be noted that all related content of the steps in the foregoing method embodiments may be cited in function description of corresponding function modules. Details are not described herein again.

The electronic device provided in this embodiment is configured to perform the address book-based device discovery method. Therefore, the same effect of the foregoing implementation methods can be achieved.

When an integrated unit is used, the electronic device may include a processing module, a storage module, and a communication module. The processing module may be configured to control and manage actions of the electronic device, for example, may be configured to support the electronic device in performing the steps performed by the display unit 901, the communications unit 902, and the processing unit 903. The storage module may be configured to support the electronic device to store program code, data, and the like. The communications module may be configured to support communication between the electronic device and another device.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a digital signal processing (DSP) and a microprocessor. The storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the electronic device in this embodiment may be a device in the structure shown in FIG. 1.

An embodiment further provides a computer storage medium. The computer storage medium stores computer instructions. When the computer instructions are run on an electronic device, the electronic device is enabled to perform the foregoing related method steps, to implement the address book-based device discovery method and the audio and video communication method in the foregoing embodiments.

An embodiment further provides a computer program product. When the computer program product runs on a computer, the computer is enabled to perform the foregoing related steps, to implement the address book-based device discovery method and the audio and video communication method in the foregoing embodiments.

In addition, an embodiment of this application further provides an apparatus. The apparatus may be a chip, a component, or a module. The apparatus may include a processor/circuit and a memory that are connected to each other. The memory is configured to store computer-executable instructions. When the apparatus runs, the processor/circuit may execute the computer-executable instructions stored in the memory, to enable the chip to perform the address book-based device discovery method and the audio and video communication method in the foregoing method embodiments.

The electronic device, the computer storage medium, the computer program product, and the chip provided in the embodiments are all configured to perform a corresponding method provided above. Therefore, for beneficial effects that can be achieved by the electronic device, the computer storage medium, the computer program product, or the chip, refer to beneficial effects of the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example.

For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a read only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A device discovery method, wherein the method comprises:
   sending, by a first device, second account information to a communication account server, wherein a contact list of the first device stores the second account information, the communication account server stores account list information, and the account list information comprises the second account information and device identifiers of M second devices, wherein M is a positive integer;
   receiving, by the first device, device identifiers of N second devices that are sent by the communication account server, wherein N is less than or equal to M, N is a positive integer, and the N second devices support audio and video communication; and
   updating, by the first device, the contact list of the first device based on the device identifiers of the N second devices, and displaying the N second devices in the contact list.

2. The method according to claim 1, wherein the account list information further comprises communication identifiers of the M second devices, and the method further comprises:
   receiving, by the first device, communication identifiers of the N second devices that are sent by the communication account server; and
   sending, by the first device, an audio and video communication request to any second device in the N second devices based on the device identifiers of the N second devices and the communication identifiers of the N second devices.

3. The method according to claim 2, wherein the M second devices comprise a personal device and a home device that are associated with the second account information, and when each second device in the N second devices is the personal device, the sending, by the first device, an audio and video communication request to any second device in the N second devices comprises:
   sending, by the first device, the audio and video communication request to each second device in the N second devices.

4. The method according to claim 2, wherein the M second devices comprise a personal device and a home device that are associated with the second account information, and when the N second devices comprise K home devices, wherein K is less than N, and K is a positive integer, the sending, by the first device, an audio and video communication request to any second device in the N second devices comprises:
   sending, by the first device, the audio and video communication request to each second device in the N second devices other than the K home devices.

5. The method according to claim 1, further comprising:
   receiving, by the first device, a first input for selecting a first contact in the contact list;
   in response to receiving the first input, displaying, by the first device in a first user interface comprising a first device identifier associated with the first contact, a first indicator associated with the first device identifier, wherein the first indicator comprises an audio call indicator or a video call indicator.

6. The method according to claim 5, further comprising:
   receiving, by the first device, a second input on the first indicator;
   in response to receiving the second input, performing, by the first device, a call to the first contact.

7. A first device, comprising:
   at least one processor; and
   a memory coupled to the at least one processor, wherein the memory comprises instructions that, when executed by the at least one processor, cause the first device to perform operations comprising:
   sending second account information to a communication account server, wherein a contact list of the first device stores the second account information, the communication account server stores account list information, and the account list information comprises the second account information and device identifiers of M second devices, wherein M is a positive integer;
   receiving device identifiers of N second devices that are sent by the communication account server, wherein N is less than or equal to M, N is a positive integer, and the N second devices support audio and video communication; and
   updating the contact list of the first device based on the device identifiers of the N second devices, and displaying the N second devices in the contact list.

8. The first device according to claim 7, wherein the account list information further comprises communication identifiers of the M second devices, and the operations further comprises:
    receiving communication identifiers of the N second devices that are sent by the communication account server; and
    sending an audio and video communication request to any second device in the N second devices based on the device identifiers of the N second devices and the communication identifiers of the N second devices.

9. The first device according to claim 8, wherein the M second devices comprise a personal device and a home device that are associated with the second account information, and when each second device in the N second devices is the personal device, the sending an audio and video communication request to any second device in the N second devices comprises:
    sending the audio and video communication request to each second device in the N second devices.

10. The first device according to claim 8, wherein the M second devices comprise a personal device and a home device that are associated with the second account information, and when the N second devices comprise K home devices, wherein K is less than N, and K is a positive integer, the sending an audio and video communication request to any second device in the N second devices comprises:
    sending the audio and video communication request to each second device in the N second devices other than the K home devices.

11. The first device according to claim 7, wherein the operations further comprise:
    receiving a first input for selecting a first contact in the contact list;
    in response to receiving the first input, displaying a first user interface comprising a first device identifier associated with the first contact and a first indicator associated with the first device identifier, wherein the first indicator comprises an audio call indicator or a video call indicator.

12. The first device according to claim 11, wherein the operations further comprise:
    receiving a second input on the first indicator;
    in response to receiving the second input, performing a call to the first contact.

13. A non-transitory computer-readable medium having processor-executable instructions stored thereon, wherein the processor-executable instructions, when executed by at least one processor, cause a first device to perform operations comprising:
    sending second account information to a communication account server, wherein a contact list of the first device stores the second account information, the communication account server stores account list information, and the account list information comprises the second account information and device identifiers of M second devices, wherein M is a positive integer;
    receiving device identifiers of N second devices that are sent by the communication account server, wherein N is less than or equal to M, N is a positive integer, and the N second devices support audio and video communication; and
    updating the contact list of the first device based on the device identifiers of the N second devices, and displaying the N second devices in the contact list.

14. The non-transitory computer-readable medium according to claim 13, wherein the account list information further comprises communication identifiers of the M second devices, and the operations further comprises:
    receiving communication identifiers of the N second devices that are sent by the communication account server; and
    sending an audio and video communication request to any second device in the N second devices based on the device identifiers of the N second devices and the communication identifiers of the N second devices.

15. The non-transitory computer-readable medium according to claim 14, wherein the M second devices comprise a personal device and a home device that are associated with the second account information, and when each second device in the N second devices is the personal device, the sending an audio and video communication request to any second device in the N second devices comprises:
    sending the audio and video communication request to each second device in the N second devices.

16. The non-transitory computer-readable medium according to claim 14, wherein the M second devices comprise a personal device and a home device that are associated with the second account information, and when the N second devices comprise K home devices, wherein K is less than N, and K is a positive integer, the sending an audio and video communication request to any second device in the N second devices comprises:
    sending the audio and video communication request to each second device in the N second devices other than the K home devices.

17. The non-transitory computer-readable medium according to claim 13, wherein the operations further comprise:
    receiving a first input for selecting a first contact in the contact list;
    in response to receiving the first input, displaying a first user interface comprising a first device identifier associated with the first contact and a first indicator associated with the first device identifier, wherein the first indicator comprises an audio call indicator or a video call indicator.

18. The non-transitory computer-readable medium according to claim 17, wherein the operations further comprise: receiving, by the first device, a second input on the first indicator;
    in response to receiving the second input, performing a call to the first contact.

\* \* \* \* \*

UNITED STATES PATENT AND TRADEMARK OFFICE
CERTIFICATE OF CORRECTION

PATENT NO. : 11,843,712 B2
APPLICATION NO. : 17/761061
DATED : December 12, 2023
INVENTOR(S) : Zhiwei Ma It is certified that error appears in the above-identified patent and that said Letters Patent is hereby corrected as shown below:

On the Title Page

Item [57], Line 12, delete "Then, a Another" and insert -- Another --.

Signed and Sealed this
Nineteenth Day of March, 2024

Katherine Kelly Vidal
*Director of the United States Patent and Trademark Office*